US012692188B2

(12) United States Patent (10) Patent No.: US 12,692,188 B2

Mauro et al. (45) Date of Patent: Jul. 28, 2026

(54) GLASS-CERAMIC COMPOSITIONS, ARTICLES, AND METHODS OF MAKING THE SAME

(71) Applicant: GÜROK HOLDING B.V., Amsterdam (NL)

(72) Inventors: John C. Mauro, Boalsburg, PA (US); Ye Luo, State College, PA (US)

(73) Assignee: GÜROK HOLDING B.V., Amsterdam (NL)

( * ) Notice: Subject to any disclaimer, the term of this patent is extended or adjusted under 35 U.S.C. 154(b) by 452 days.

(21) Appl. No.: 18/018,338

(22) PCT Filed: Jul. 28, 2021

(86) PCT No.: PCT/IB2021/056881
§ 371 (c)(1),
(2) Date: Jan. 27, 2023

(87) PCT Pub. No.: WO2022/024007
PCT Pub. Date: Feb. 3, 2022

(65) Prior Publication Data

US 2023/0303428 A1 Sep. 28, 2023

Related U.S. Application Data

(60) Provisional application No. 63/057,404, filed on Jul. 28, 2020.

(51) Int. Cl.
*C03C 1/00* (2006.01)
*A47J 36/04* (2006.01)
(Continued)

(52) U.S. Cl.
CPC .......... *C03C 10/0027* (2013.01); *A47J 36/04* (2013.01); *C03B 25/00* (2013.01); *C03B 32/02* (2013.01);
(Continued)

(58) Field of Classification Search
CPC ..... C03C 10/0027; C03C 1/004; C03C 3/085; C03B 32/02; A47G 19/02
See application file for complete search history.

(56) References Cited

U.S. PATENT DOCUMENTS

| | | |
|---|---|---|
| 4,184,061 A | 1/1980 | Suzuki et al. |
| 4,461,839 A | 7/1984 | Rittler |

(Continued)

FOREIGN PATENT DOCUMENTS

| | | |
|---|---|---|
| WO | 2013/107653 A2 | 7/2013 |
| WO | 2019/108823 A1 | 6/2019 |

OTHER PUBLICATIONS

First Office Action from corresponding Chinese Patent Application No. 202180044361.4, dated Dec. 17, 2024, 42 pages.

(Continued)

*Primary Examiner* — Laura A Auer
(74) *Attorney, Agent, or Firm* — Meunier Carlin & Curfman LLC

(57) ABSTRACT

Disclosed herein are glass-ceramic compositions, articles made from the disclosed glass-ceramic compositions, and methods of making the same. More specifically disclosed herein is a glass-ceramic composition comprising: a) from about 2 mol % to about 20 mol % of $Al_2O_3$; b) from about 2 mol % to about 45 mol % of $Li_2O$; and c) from about 48 mol % to about 80 mol % of $SiO_2$; having a β-spodumene phase and a lithium silicate crystalline phase, and optionally a petalite phase.

5 Claims, 10 Drawing Sheets

(51) Int. Cl.

| | |
|---|---|
| *C03B 25/00* | (2006.01) |
| *C03B 32/02* | (2006.01) |
| *C03C 4/02* | (2006.01) |
| *C03C 10/00* | (2006.01) |
| *C03C 13/00* | (2006.01) |
| *C03C 21/00* | (2006.01) |
| *A47G 19/02* | (2006.01) |

(52) U.S. Cl.
CPC ............... *C03C 1/004* (2013.01); *C03C 4/02* (2013.01); *C03C 10/0054* (2013.01); *C03C 13/007* (2013.01); *C03C 21/00* (2013.01); *A47G 19/02* (2013.01); *A47G 2400/10* (2013.01); *C03C 2204/04* (2013.01)

(56) References Cited

U.S. PATENT DOCUMENTS

| | | | |
|---|---|---|---|
| 4,507,392 | A | 3/1985 | Rittler |
| 4,835,121 | A | 5/1989 | Shibuya et al. |
| 8,765,619 | B2 | 7/2014 | Brunet et al. |
| 9,260,342 | B2 | 2/2016 | Borczuch-Laczka et al. |
| 9,701,573 | B2 | 7/2017 | Beall et al. |
| 9,801,435 | B2 | 10/2017 | Dymshits et al. |
| 9,809,488 | B2 | 11/2017 | Beall et al. |
| 10,028,580 | B2 | 7/2018 | Doerk et al. |
| 10,081,568 | B2 | 9/2018 | Plevacova et al. |
| 10,227,255 | B2 | 3/2019 | Ritzberger et al. |
| 11,104,608 | B2 | 8/2021 | Andrews et al. |
| 11,453,612 | B2 | 9/2022 | Roussev et al. |
| 11,926,555 | B2 | 3/2024 | Beunet et al. |
| 12,098,090 | B1 | 9/2024 | Beall et al. |
| 2003/0013593 | A1* | 1/2003 | Beall ................... C03C 10/0018 501/10 |
| 2014/0370464 | A1 | 12/2014 | Kounga et al. |
| 2018/0099901 | A1 | 4/2018 | Beall et al. |
| 2019/0161395 | A1* | 5/2019 | Beall ................... H05K 5/0017 |
| 2020/0148591 | A1 | 5/2020 | Andrews et al. |
| 2020/0156994 | A1 | 5/2020 | Li et al. |

OTHER PUBLICATIONS

Search Report from corresponding Russian Patent Application No. 2023103858, dated Dec. 24, 2024, 4 pages.
First Office Action from corresponding Russian Patent Application No. 2023103858, dated Dec. 25, 2024, 28 pages.
First Office Action from corresponding Brazilian Patent Application No. 112023001555-3, dated Apr. 1, 2025, 2 pages.
Second Office Action from corresponding Russian Patent Application No. 2023103858, dated May 5, 2025, 12 pages.
First Office Action from corresponding Vietnamese Patent Application No. 1-2023-00653, dated Jun. 5, 2025, 4 pages.
Second Office Action from corresponding Chinese Patent Application No. 202180044361.4, dated Jun. 13, 2025, 30 pages.
First Office Action from corresponding Japanese Patent Application No. 2022574222, dated Jul. 8, 2025, 22 pages.
International Searching Authority (ISA/EP). International Search Report and Written Opinion. Issued in PCT Application No. PCT/IB2021/056881 on Jan. 4, 2022. 22 pages.
Anstis et al. A critical evaluation of indentation techniques for measuring fracture toughness: I, direct crack measurements. J. Am. Ceram. Soc. 64 (9) (1981) 533-538.
Beall et al. Transparent glass-ceramics, J. Mater. Sci. 4 (4) (1969) 340-352.
Beall Design and properties of glass-ceramics, Annu. Rev. Mater. Sci. 22 (1) (1992) 91-119.
Beall et al. Nanophase glass-ceramics, J. Am. Ceram. Soc. 82 (1) (1999) 5-16.

Cantalini et al. Characterization of crystal phases, morphology, and crystallization processes in lithium aluminosilicate glass-ceramic. J. Mater. Sci. 27 (2) (1992) 448-452.
Deng et al. Molecular dynamics simulations on fracture toughness of Al2O3—SiO2 glass-ceramics, Scr. Mater. 162 (2019) 277-280.
Denry et al. Ceramics for dental applications: a review, Mater., 3 (1) (2010) 351-368.
Feltz et al. Redox reactions in condensed oxide systems: III. Glass formation and properties in the Bi2O3☐ P2O5 system. J. of non-Cryst. solids 74 (2-3) (1985) 313-324.
Gonçalves et al. Rare-earth-doped transparent glass ceramics, C. R. Chim. 5 (12) (2002) 845-854.
Guo et al. Unified approach for determining the enthalpic fictive temperature of glasses with arbitrary thermal history. J. of Non-Cryst. Solids 357 (16-17) (2011) 3230-3236.
Hartmann et al. Zerodur®glass ceramics for high stress applications. In Optical Materials and Structures Technologies IV (vol. 7425, p. 74250M). Int. Soc. Opt. Photonics (2009).
Holand et al. Glass-ceramic technology, John Wiley & Sons (2019).
Hu et al. Growth behavior, morphology and properties of lithium aluminosilicate glass ceramics with different amount of CaO, MgO and TiO2 additive. Ceram, Int. 34 (6) (2008) 1393-1397.
Lawn et al. Hardness, toughness, and brittleness: an indentation analysis. J. Am. Ceram. Soc. 62 (7-8) (1979) 347-350.
Li. The crystal structure of LiAlSi2O6 III (high-quartz solid solution), Z. Kristallogr.-Cryst. Mater. 127 (1-6) (1968) 327-348.
Luo et al. Synthesis and characterization of K2O—ZnO—GeO2—SiO2 optical glasses. J. of Non-Cryst. Solids 503 (2019) 308-312.
Mauro et al. Viscosity of glass-forming liquids, Proc. Natl. Acad. Sci. U. S. A. 106 (2009) 19780-19784.
Murthy, K. et al. Phase equilibria in the system lithium metasilicate-β-eucryptite, J. Am. Ceram. Soc. 37 (1) (1954) 14-17.
Pönitzsch et al. Bulk elastic properties, hardness and fatigue of calcium aluminosilicate glasses in the intermediate-silica range. J. of non-Cryst. Solids 434 (2016) 1-12.
Quinn. Fracture toughness of ceramics by the Vickers indentation crack length method: a critical review. In Ceram. Eng. Sci. Proc. vol. 27. No. 2. American Ceramic Society (2007).
Ross et al. Petalite under pressure: Elastic behavior and phase stability, Am. Mineral. 100 (4) (2015) 714-721.
Roy et al. Compositional and stability relationships among the lithium aluminosilicates: eucryptite, spodumene, and petalite. J. Am. Ceram. Soc. 33[5] (1950) 152-159.
Sehgal et al. Brittleness of glasses by indentation. J. Mater. Sci. Lett. 14 (3) (1995) 167-169.
Shoji et al. Low-temperature anodic bonding using lithium aluminosilicate-ß-quartz glass ceramic. Sens. Actuators, A 64 (1) (1998) 95-100.
Wen et al. Pressureless crystallization of glass for transparent nanoceramics, Adv. Sci. 6 (17) (2019) 1901096.
Yoshida et al. Crack initiation behavior of sodium aluminosilicate glasses. J. of non-Cryst. solids 344 (1-2) (2004) 37-43.
Zanotto. Bright future for glass-ceramics. Am. Ceram. Soc. Bull. 89 (8) (2010) 19-27.
Zhang et al. Lithium Disilicate Glass-Ceramics by Heat Treatment of Lithium Metasilicate Glass-Ceramics Obtained by Hot Pressing. J. Am. Ceram. Soc. 98 (12) (2015) 3659-3662.
Zheng et al. Viscosity of glass-forming systems, J. Am. Ceram. Soc. 100 (2017) 6-25.
International Bureau of WIPO. International Preliminary Report on Patentability in Application No. PCT/IB2021/056881, mailed Feb. 9, 2023, 15 pages.
Saudi Arabian First Substantive Examination Report in Application No. 523442320, dated Nov. 17, 2023, 8 pages.
Canadian Office Action in Application No. 3,172,488, dated Jan. 8, 2024, 6 pages.
Willhauk et al. Glass ceramics for household appliances. Low thermal expansion glass-ceramics, 2nd edn. Springer Verlag, Heidelberg (2005) 51-58.

\* cited by examiner

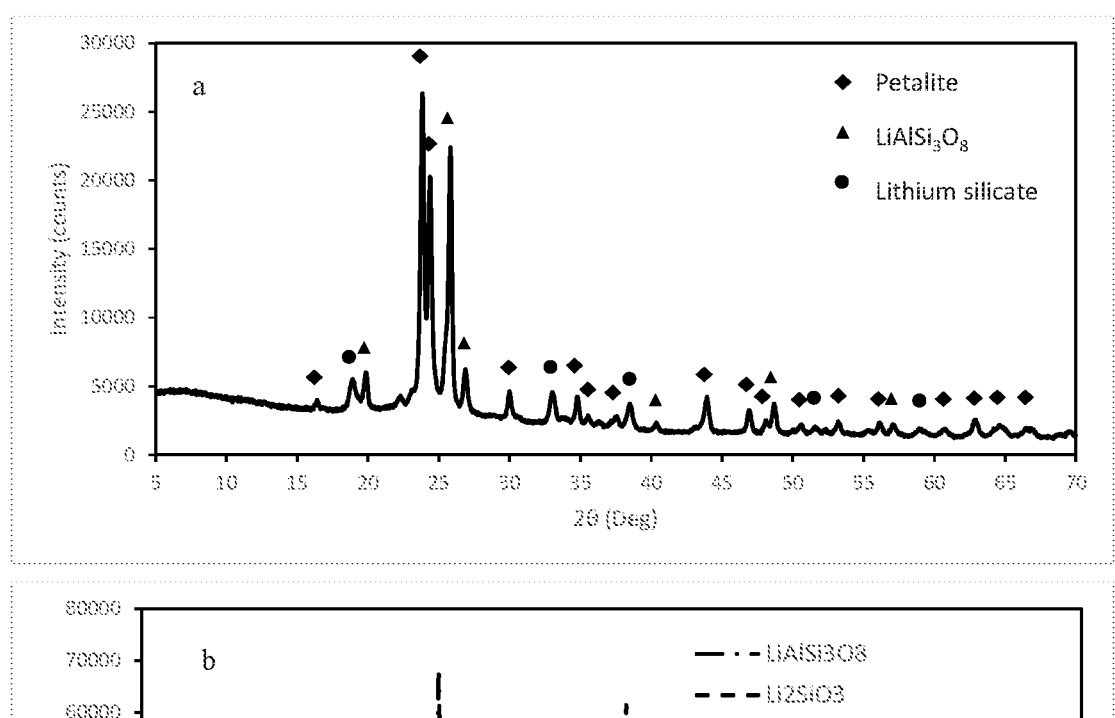
FIGS. 2A-B

GLASS-CERAMIC COMPOSITIONS, ARTICLES, AND METHODS OF MAKING THE SAME

CROSS-REFERENCE TO RELATED APPLICATIONS

This application is a national stage application filed under 35 U.S.C. § 371 of PCT/IB2021/056881, filed Jul. 28, 2021, which claims the benefit of priority to U.S. Provisional Application No. 63/057,404, filed Jul. 28, 2020, the content of which is incorporated by reference herein in its entirety.

TECHNICAL FIELD

The present invention generally relates to glass-ceramic compositions, glass-ceramic articles comprising the same, and methods of making the same.

BACKGROUND

Glass-ceramics, nucleated and crystallized from a certain composition of glass, are known for their low thermal expansion, high mechanical strength, and good thermal stability. Glass-ceramics, such as $Li_2O$—$Al_2O_3$—$SiO_2$ (LAS) systems, combine the advantages of near-zero thermal expansion and good transparency, together with high fracture toughness and ion-exchange potential. It is known that $Li_2O$—$Al_2O_3$—$SiO_2$ glass-ceramics can contain different phases, such as β-quartz solid solution and β-spodumene solid solution, or petalite. It is also known that the properties of the glass-ceramic compositions are strongly dependent on their phase composition.

It was shown in the past that the glass-ceramics could be designed with near-zero thermal expansion over a large temperature range by balancing the amount of negative expansion of the β-quartz and positive expansion of the residue glass. Many commercial glass-ceramics (Vision (Corning [11-12]), Zerodur, and Ceran (Schott [13-17]), Narumi and Neoceram™ N=0 (NipponElectric [18-19])) containing β-quartz crystals have been used to make radiant cooktops, transparent cookware, woodstove windows, and fire doors.

The β-spodumene solid solutions formed when the β-quartz is heated at 850° C. for eight hours. Corning Ware® 9608, containing β-spodumene main phase and rutile minor phase, is a well-known glass-ceramics used for low-cost kitchen applications. However, most of the β-spodumene glass-ceramics are opaque, as they crystallize at relatively high temperature and low viscosity.

Accordingly, a need exists for alternative glass-ceramics compositions having improved mechanical properties while exhibiting transparent, opaque, or translucent properties, depending on a specified need. These needs and other needs are at least partially satisfied by the present disclosure.

SUMMARY

The present invention is directed to a glass-ceramic composition comprising: a) from about 2 mol % to about 20 mol % of $Al_2O_3$; b) from about 2 mol % to about 45 mol % of $Li_2O$; and c) from about 48 mol % to about 80 mol % of $SiO_2$; having a β-spodumene phase and a lithium silicate crystalline phase, and optionally a petalite phase. In yet further aspects, when $Al_2O_3$ is present from about 5 mol % to about 7.5 mol %, the glass-ceramic composition comprises a major crystalline phase comprising from about 20 to about 80% of the β-spodumene phase and from about 20 to about 80% of the petalite phase and a minor crystalline phase comprising up to about 10% of the lithium silicate phase. While yet in other aspects, when $Al_2O_3$ is present from about 7 mol % to about 12 mol %, the glass-ceramic composition comprises a major crystalline phase comprising from about 60% to about 90% of the β-spodumene phase and a minor crystalline phase comprising up to about 10% of the lithium silicate phase.

In still further aspects, the disclosed glass-ceramic compositions can further comprise: a) from 0 mol % to about 8 mol % of $B_2O_3$, b) from 0 mol % to about 8 mol % of $ZrO_2$, c) from 0 mol % to about 5 mol % of $P_2O_5$, and d) from 0 mol % to about 5 mol % of $Na_2O$.

Also disclosed herein is a glass-ceramic composition comprising: a) $Al_2O_3$ present from about 2 mol % to about 20 mol %, b) $SiO_2$ present from about 48 mol % to about 80 mol %, c) $R'_2O$ present from greater than 0 mol % to about 45 mol %; and wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase. In such exemplary aspects, when $Al_2O_3$ is present from about 5 mol % to about 7.5 mol %, the glass-ceramic composition comprises a major crystalline phase comprising from about 20 to about 80% of the β-spodumene phase and from about 20 to about 80% of the petalite phase. While in yet other aspects, when $Al_2O_3$ is present from about 5 mol % to about 7.5 mol % and $Li_2O$ is present from 20 mol % to about 25 mol %, the glass-ceramic composition comprises a major crystalline phase comprising from about 20 to about 80% of the β-spodumene phase and from about 20 to about 80% of the petalite phase, and a minor phase comprises up to 10 mol % of the lithium silicate phase. In still further aspects, such compositions can further comprise: a) $B_2O_3$ present from 0 mol % to about 8 mol %, b) $ZrO_2$ from 0 mol % to about 8 mol %, and c) $P_2O_5$ from 0 mol % to about 5 mol %. In still further aspects, the disclosed herein compositions can comprise a compressive stress layer.

Also disclosed herein is a glass-ceramic article comprising any of the preceding compositions. In certain aspects, also disclosed is a glass-ceramic article comprising compositions having a compressive stress layer. In such exemplary aspects, disclosed are articles where the compressive stress layer extends from a surface of the article to a depth of the compressive stress layer, and wherein the depth is from about 1 μm to about 100 μm.

Also is disclosed a glass-ceramic article comprising: a) from about 2 mol % to about 20 mol % of $Al_2O_3$, b) $SiO_2$ present from about 48 mol % to about 80 mol %; and $R'_2O$ present from greater than 0 mol % to about 45 mol %; wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase. The articles disclosed herein can comprise a hollowware, tableware, container, plate, sheet, float/flat sheet, cookware, powder, fiber, cones, spheres, blades, or any combination thereof. In still further aspects, the articles disclosed herein can be formed by a float or flat glass press process, a press-and-blow process, a blow-and-blow process, or any combination thereof.

Also disclosed herein are methods comprising: a) forming a mixture comprising from about 2 mol % to about 20 mol % of $Al_2O_3$, from about 2 mol % to about 45 mol % of $Li_2O$; and from about 48 mol % to about 80 mol % of $SiO_2$; b) forming a homogeneous composition; and c) ceramming the homogeneous composition to form a glass-ceramic composition. In yet further aspects, the methods disclosed herein further comprise a step of ion-exchange treatment comprising placing the glass-ceramic composition into a molten salt bath comprising sodium, potassium, silver, or copper (I) ions or a combination thereof at conditions effective to provide an ion-exchanged glass-ceramic composition. In such exemplary aspects, the formed the ion-exchanged glass-ceramic composition comprises: a) $Al_2O_3$ present from about 2 mol % to about 20 mol %; b) $SiO_2$ present from about 48 mol % to about 80 mol %; c) $R'_2O$ present from greater than 0 mol % to about 45 mol %; and wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase.

Also disclosed herein are methods of forming an article comprising forming any of the disclosed above compositions and then forming the article, wherein the article comprises a hollowware, tableware, container, plate, sheet, float or flat sheet, cookware, powder, fiber, cones, spheres, blades, or any combination thereof. In still further aspects, the step of forming the glass-ceramic articles comprises a float or flat press process, a press-and-blow process, a blow-and-blow process, or any combination thereof.

Additional aspects of the disclosure will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF DRAWINGS

FIGS. 2A-2B depict XRD patterns: FIG. 2A shows an XRD pattern of exemplary glass-ceramics, with petalite and $LiAlSi_3O_8$ as the main two phases, and $Li_2SiO_3$ as a minor phase; FIG. 2B shows an exemplary XRD pattern of other exemplary glass-ceramics. When $Al_2O_3$ in the composition is too high, the formation of the $LiAlSi_3O_8$ phase is favorable. When $Al_2O_3$ is too low in the composition, the formation of the $Li_2SiO_3$ phase is favorable. When $SiO_2$ is too high in the composition, the formation of the $SiO_2$ phase is favorable.

FIG. 3A shows an exemplary DSC pattern of samples with different amounts of $Li_2O$ and $Al_2O_3$; FIG. 3B shows glass transition temperature ($T_g$) change with a change in the weight percent of $Al_2O_3$.

DETAILED DESCRIPTION

Figure 1:
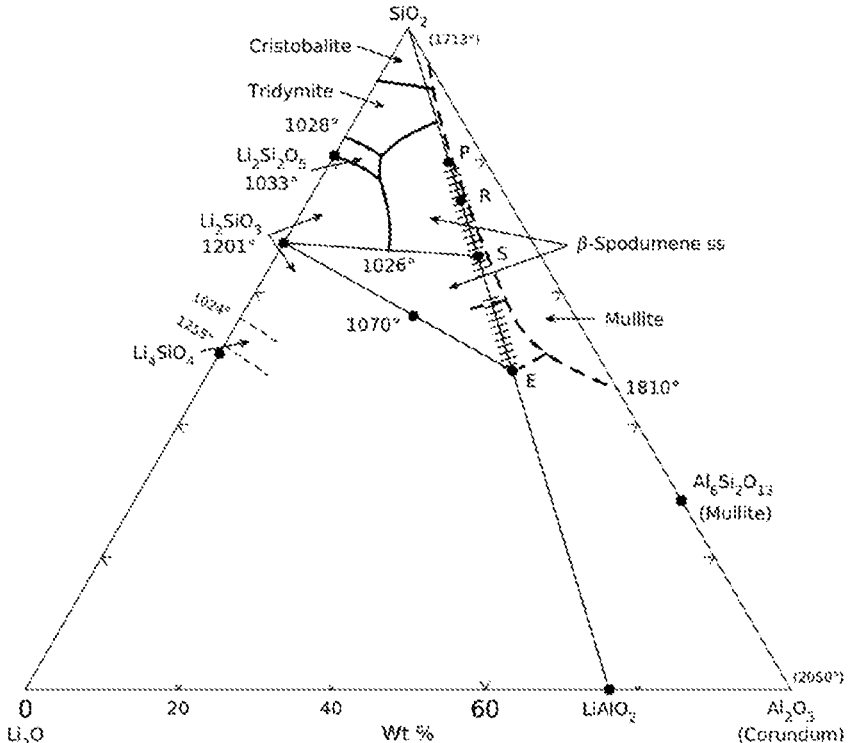
FIG. 1 shows the phase diagram of $Li_2O$—$Al_2O_3$—$SiO_2$ (according to reference [6]).

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

As used herein; the singular forms "a," "an," and "the" include plural referents unless the context clearly dictates otherwise. Thus, for example, reference to an "article" includes aspects having two or more such articles unless the context clearly indicates otherwise.

It is appreciated that certain features of the disclosure, which are, for clarity, described in the context of separate aspects, can also be provided in combination in a single aspect. Conversely, various features of the disclosure, which are, for brevity, described in the context of a single aspect, can also be provided separately or in any suitable combination.

As used herein, the terms "optional" or "optionally" mean that the subsequently described event or circumstance may or may not occur, and that the description includes instances where said event or circumstance occurs and instances where it does not.

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims, which follow, reference will be made to a number of terms that shall be defined herein.

For the terms "for example" and "such as," and grammatical equivalences thereof, the phrase "and without limitation" is understood to follow unless explicitly stated otherwise.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value and/or to "about" another particular value. When such a range is expressed, another aspect includes from the one particular value and/or to the other particular value.

Similarly, when values are expressed as approximations, by use of the antecedent "about," it will be understood that the particular value forms another aspect. It will be further understood that the endpoints of each of the ranges are significant both in relation to the other endpoint and independently of the other endpoint. Unless stated otherwise, the term "about" means within 5% (e.g., within 2% or 1%) of the particular value modified by the term "about."

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

As used herein, the term "composition" is intended to encompass a product comprising the specified ingredients in the specified amounts, as well as any product which results, directly or indirectly, from a combination of the specified ingredients in the specified amounts, A weight percent (wt. %) of a component, unless specifically stated to the contrary, is based on the total weight of the formulation or composition in which the component is included. In the aspects where the glass compositions are described, the concentration of constituent components (e.g., $SiO_2$, $Al_2O_3$, $B_2O_3$, and the like) are given in a mole percent (mol %) on an oxide basis, unless otherwise specified.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items.

It will be understood that, although the terms "first," "second," etc., may be used herein to describe various elements, components, regions, layers, and/or sections. These elements, components, regions, layers, and/or sections should not be limited by these terms. These terms are only used to distinguish one element, component, region, layer, or section from another element, component, region, layer, or a section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein interpreted accordingly.

As used herein, the term "substantially" means that the subsequently described event or circumstance completely occurs or that the subsequently described event or circumstance generally, typically, or approximately occurs.

Still further, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to indicate that the recited component is not intentionally batched and added to the composition, but can be present as an impurity along with other components being added to the composition. In such aspects, the term "substantially free" is intended to refer to trace amounts that can be present in the batched components, for example, it can be present in an amount that is less than about 1% by weight, e.g., less than about 0.5% by weight, less than about 0.1% by weight, less than about 0.05% by weight, or less than about 0.01% by weight of the stated material, based on the total weight of the composition.

In other aspects, as used herein, the term "substantially free," when used in the context of a surface substantially free of defects, for example, is intended to refer to a surface that has less than about 5% of defects, less than about 4.5% of defects, less than about 4% of defects, less than about 3.5% of defects, less than about 3% of defects, less than about 2.5% of defects, less than about 2% of defects, less than about 1.5% of defects, less than about 1% of defects, less than about 0.5% of defects, less than about 0.1% of defects, less than about 0.05% of defects, or less than about 0.01% of defects of the total surface.

As used herein, the term "substantially," in, for example, the context "substantially identical" or "substantially similar" refers to a method or a system, or a component that is at least about 90%, at least about 91%, at least about 92%, at least about 93%, at least about 94%, at least about 95%, at least about 96%, at least about 97%, at least about 98%, at least about 99%, or about 100% by similar to the method, system, or the component it is compared to.

As used herein, the terms a glass transition temperature or $T_g$ can be used interchangeably and is defined as the inflection point of a differential scanning calorimetry (DSC) curve during the second heating, where the cooling and heating of the sample occurs at a rate of 10° C./min and is plotted as Heat Flow in mW vs. Temperature in ° C.

The term "liquidus viscosity," as used herein, refers to the shear viscosity of the glass composition at its liquidus temperature.

The term "liquidus temperature," as used herein, refers to the highest temperature at which devitrification occurs in the glass composition.

The term "CTE," as used herein, refers to the coefficient of thermal expansion of the glass composition averaged over a temperature range from about 25° C. to about 300° C.

As used herein, the term "ion-exchanged" refers to glass-ceramics that are chemically strengthened by ion exchange processes in which the glass-ceramic compositions are treated with a heated salt bath, spray, or paste containing ions having a different ionic radius than ions that are present in the glass-ceramic surface and/or bulk. The ions in the bath (or spray or paste) replace those ions in the glass-ceramic, which can be smaller in radius (or vice versa depending on the temperature conditions). Glass-ceramics that are subjected to such ion-exchange treatment(s) are referred to herein as "ion-exchanged glass-ceramic compositions (or articles)." It is further understood that the ion exchange process, as described herein, is not limited to salt baths, sprays, or pastes, and any other process that can ensure ion exchange within the glass-ceramics can also be included, for example, and without limitation, vapor-assisted, plasma-assisted, or sol-gel processes. Also, in some exemplary and unlimiting aspects, when a heated salt bath is used in the ion-exchange process, for example, such processes can be further accelerated by applying an electrical field to the bath.

While aspects of the present invention can be described and claimed in a particular statutory class, such as the system statutory class, this is for convenience only and one of ordinary skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred in any respect. This holds for any possible non-express basis for interpretation, including matters of logic with respect to arrangement of steps or operational flow, plain meaning derived from grammatical organization or punctuation, or the number or type of aspects described in the specification.

The present invention may be understood more readily by reference to the following detailed description of various aspects of the invention and the examples included therein and to the Figures and their previous and following description.

The present invention may be understood more readily by reference to the following detailed description of various aspects of the invention and the examples included therein and to the Figures and their previous and following description.

Compositions

In some aspects described herein is a glass-ceramic composition comprising: a) from about 2 mol % to about 20 mol % of $Al_2O_3$; b) from about 2 mol % to about 45 mol % of $Li_2O$; and c) from about 48 mol % to about 80 mol % of $SiO_2$; having a β-spodumene phase and a lithium silicate crystalline phase, and optionally a petalite phase. In yet further aspects, disclosed is a glass-ceramic composition comprising: a) from about 3 mol % to about 12 mol % of $Al_2O_3$; b) from about 13 mol % to about 45 mol % of $Li_2O$; and c) from about 48 mol % to about 75 mol % of $SiO_2$; having a β-spodumene phase and a lithium silicate crystalline phase, and optionally a petalite phase.

It is understood that $SiO_2$ represents the largest component of the disclosed glass compositions. $SiO_2$ is one of the most commonly studied glass-forming oxides. Without wishing to be bound by any theory, it is understood that the high percent of $SiO_2$ can be responsible for the high mechanical strength of the compositions, as $SiO_2$ can stabilize the network structure of glass and glass-ceramics. In a certain aspect, where the amount of $SiO_2$ is not high enough, β-spodumene $(Li_2O \cdot Al_2O_3 \cdot 4SiO_2)$ and β-spodumene solid solution $(Li_2O \cdot Al_2O_3 \cdot nSiO_2, 4 \leq n \leq 10)$ can be preferably formed instead of petalite $(Li_2O \cdot Al_2O_3 \cdot 8SiO_2)$ crystals. Yet, in aspects where the amount of $SiO_2$ is too high, the crystalline to amorphous ratio can be relatively low, resulting in a high melting temperature of the glass.

In aspects disclosed herein, $SiO_2$ can be present in any amount from about 48 to about 80 mol %, including exemplary values of about 50 mol %, about 51 mol %, about 52 mol %, about 53 mol %, about 54 mol %, about 55 mol %, about 56 mol %, about 57 mol %, about 58 mol %, about 59 mol %, about 60 mol %, about 61 mol %, about 62 mol %, about 63 mol %, about 64 mol %, about 65 mol %, about 66 mol %, about 67 mol %, about 68 mol %, about 69 mol %, about 70 mol %, about 71 mol %, about 72 mol %, about 73 mol %, about 74 mol %, about 75 mol %, about 76 mol %, about 77 mol %, about 78 mol %, and about 79 mol %. It is understood that $SiO_2$ can be present in any amount having value between any two foregoing value, for example from about 45 mol % to about 75 mol %, or from about 55 mol % to about 80 mol %, or from about 65 mol % to about 80 mol %, or from about 65 mol % to about 75 mol %.

In still further aspects, it is understood that $Al_2O_3$ can also be a stabilizing component of the glass network structure. The presence of $Al_2O_3$ can also improve the mechanical properties of the glass (or glass-ceramic) compositions. In certain aspects, where the amount of $Al_2O_3$ is too high, the fraction of the petalite phase decreases according to the phase diagram. However, when the amount of $Al_2O_3$ is too low, the lithium silicate phase can be formed instead of the β-spodumene solid solution. In aspects disclosed herein, $Al_2O_3$ can be present in any amount from about 2 mol % to about 20 mol %, including exemplary values of about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, and about 19 mol %. It is understood that $Al_2O_3$ can be present in any amount having a value between any two foregoing values, for example, from about 3 mol % to about 12 mol %, or from about 5 mol % to about 15 mol %, or from about 6 mol % to about 14 mol %.

In glass and glass-ceramics, $Li_2O$ can be added to form both petalite and β-spodumene solid solution crystals. Without wishing to be bound by any theory, it is assumed that a high percent of $Li_2O$ increases the ion-exchange potential of glass ceramics, as Li atoms are relatively small compared with Na and K that can be used for ion-exchange. However, if the amount of $Li_2O$ is too high, the composition can become very fluid, affecting the production cost. In aspects disclosed herein, $Li_2O$ can be present in any amount from about 2 mol % to about 45 mol %, including exemplary values of about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol %, about 21 mol %, about 22 mol %, about 23 mol %, about 24 mol %, about 25 mol %, about 26 mol %, about 27 mol %, about 28 mol %, about 29 mol %, about 30 mol %, about 31 mol %, about 32 mol %, about 33 mol %, about 34 mol %, about 35 mol %, about 36 mol %, about 37 mol %, about 38 mol %, about 39 mol %, about 40 mol %, about 41 mol %, about 42 mol %, about 43 mol %, and about 44 mol %. It is understood that $Li_2O$ can be present in any amount having a value between any two foregoing values, for example, from about 13 mol % to about 45 mol %, or from about 5 mol % to about 15 mol %, or from about 8 mol % to about 12 mol %.

In yet further aspects, when $Al_2O_3$ is present from about 5 mol % to about 7.5 mol %, including exemplary values of about 5.1 mol %, about 5.2 mol %, about 5.3 mol %, about 5.4 mol %, about 5.5 mol %, about 5.6 mol %, about 5.7 mol %, about 5.8 mol %, about 5.9 mol %, about 6.0 mol %, about 6.1 mol %, about 6.2 mol %, about 6.3 mol %, about 6.4 mol %, about 6.5 mol %, about 6.6 mol %, about 6.7 mol %, about 6.8 mol %, about 6.9 mol %, about 6.9 mol %, about 7.0 mol %, about 7.1 mol %, about 7.2 mol %, about 7.3 mol %, and about 7.4 mol %, the glass-ceramic composition comprises a major crystalline phase comprising from about 20 to about 80% of the β-spodumene phase and from about 20 to about 80% of the petalite phase and a minor crystalline phase comprising up to about 10% of the lithium silicate phase.

In such exemplary aspects, the major crystalline phase can comprise from about 20 to about 80% of the β-spodumene phase, including exemplary values of about 25%, about 30%, about 35%, about 40%, about 45%, about 50%, about 55%, about 60%, about 65%, about 70%, and about 75% of the β-spodumene phase. In such exemplary aspects, the major phase can further comprise from about 20 to about 80% of the β-spodumene phase, including exemplary values of about 25%, about 30%, about 35%, about 40%, about 45%, about 50%, about 55%, about 60%, about 65%, about 70%, and about 75% of the petalite phase. While in still further aspects, the minor crystalline phase can comprise up to about 10% of the lithium silicate phase, including exemplary values of about 0.01%, about 0.05%, about 0.1%, about 0.5%, about 1%, about 2%, about 3%, about 4%, about 5%, about 6%, about 7%, about 8%, about 9%, about 9.5, and about 9.99%.

In yet further exemplary aspects, when $Al_2O_3$ is present from about 5 mol % to about 7.5 mol %, $Li_2O$ can be present from about 20 mol % to about 25 mol %, including exemplary values of about 21 mol %, about 21.5 mol %, about 22 mol %, about 22.5 mol %, about 23 mol %, about 23.5 mol %, about 24 mol %, and about 24.5 mol %.

In still further aspects, when $Al_2O_3$ is present from about 7 mol % to about 12 mol %, including exemplary values of about 7.1 mol %, about 7.2 mol %, about 7.3 mol %, about 7.4 mol %, about 7.5 mol %, about 7.6 mol %, about 7.7 mol %, about 7.8 mol %, about 7.9 mol %, about 8.0 mol %, about 8.1 mol %, about 8.2 mol %, about 8.3 mol %, about 8.4 mol %, about 8.5 mol %, about 8.6 mol %, about 8.7 mol %, about 8.8 mol %, about 8.9 mol %, about 9.0 mol %, about 9.1 mol %, about 9.2 mol %, about 9.3 mol %, and about 9.4 mol %, about 9.5 mol %, about 9.6 mol %, about 9.7 mol %, about 9.8 mol %, about 9.9 mol %, about 10.0 mol %, about 10.1 mol %, about 10.2 mol %, about 10.3 mol %, about 10.4 mol %, about 10.5 mol %, about 10.6 mol %, about 10.7 mol %, about 10.8 mol %, about 10.9 mol %, about 11.00 mol %, about 11.1 mol %, about 11.2 mol %, about 11.3 mol %, about 11.4 mol %, about 11.5 mol %, about 11.6 mol %, about 11.7 mol %, about 11.8 mol %, and about 11.9 mol %, the glass-ceramic composition comprises a major crystalline phase comprising from about 60% to about 90% of the β-spodumene phase and a minor crystalline phase comprising up to about 10% of the lithium silicate phase. In such aspects, the major crystalline phase can comprise from about 60% to about 90% of the β-spodumene phase, including exemplary values of about 65%, about 70%, about 75%, about 80%, and about 85% of the β-spodumene phase. While in other aspects, the minor crystalline phase comprising up to about 10% of the lithium silicate phase, including exemplary values of greater than 0%, about 0.01%, about 0.05%, about 0.1%, about 0.5%, about 1%, about 2%, about 3%, about 4%, about 5%, about 6%, about 7%, about 8%, about 9%, about 9.5%, about 9.9%, and about 9.99%.

In yet further exemplary and unlimiting aspects, when the lithium silicate crystalline phase is present, such a phase can comprise a lithium metasilicate crystalline phase.

In yet further aspects, a molar ratio of β-spodumene solid solution $Li_2O:Al_2O_3:SiO_2$ can be in the range between about 1:1:4 and 1:1:8, including exemplary values of about 1:1:5, about 1:1:6, and about 1:1:7.

In some exemplary aspects, the glass-ceramic compositions as disclosed herein can further comprise a) from 0 mol % to about 8 mol % of $B_2O_3$, b) from 0 mol % to about 8 mol % of $ZrO_2$, c) from 0 mol % to about 5 mol % of $P_2O_5$, and d) from 0 mol % to about 5 mol % of $Na_2O$. While, in other aspects, the glass-ceramic compositions as disclosed herein can further comprise a) from 0 mol % to about 5 mol % of $B_2O_3$, b) from 0 mol % to about 3 mol % of $ZrO_2$, c) from 0 mol % to about 3 mol % of $P_2O_5$, and d) from 0 mol % to about 3 mol % of $Na_2O$.

In such exemplary aspects, the $B_2O_3$ can be present in any amount from 0 mol % to about 8 mol %, including exemplary values of about 0.01 mol %, about 0.05 mol %, about 0.1 mol %, about 0.5 mol %, about 1 mol %, about 2 mol %, about 3 mol %, about 4 mol %, about 5 mol %, about 6 mol %, and about 7 mol %. It is understood that $B_2O_3$ can be present in any amount having a value between any two foregoing values, for example, from about 0.1 mol % to about 5 mol %, from about 0.1 mol % to about 3 mol %, or from about 0.1 mol % to about 2 mol %. It is understood that in some aspects, $B_2O_3$ can decrease the viscosity of the composition at the crystal-growth temperature and provide a three-coordinated network when boron is not charge-balanced by alkali oxides. Without wishing to be bound by any theory, it is assumed that such an exemplary structure can decrease the activation barrier for the movement of atoms from liquid to crystals, and thus lower the crystal-growth temperature and increase the crystalline to amorphous ratio. In still further aspects, $B_2O_3$ can increase chemical durability and glass-forming ability of the composition.

In further aspects, the $ZrO_2$ can be present in any amount from 0 mol % to about 8 mol %, including exemplary values of about 0.01 mol %, about 0.05 mol %, about 0.1 mol %, about 0.5 mol %, about 1 mol %, about 2 mol %, about 3 mol %, about 4 mol %, about 5 mol %, about 6 mol %, and about 7 mol %. It is understood that $ZrO_2$ can be present in any amount having a value between any two foregoing values, for example, from 0 mol % to about 3 mol %, or from about 0.1 mol % to about 6 mol %, or from about 2 mol % to about 6 mol %. Again, without wishing to be bound by any theory, it is assumed that $ZrO_2$ can increase the transparency of LAS glass-ceramics. Without wishing by any theory, it is hypothesized that due to the large Zr atom, the activation barrier can be increased, leading to the decrease of the frequency of successful jump of atoms from liquid to crystals. A high concentration of $ZrO_2$ is hypothesized to decrease the crystal-growth temperature. However, in yet other aspects, the presence of a larger amount of $ZrO_2$ can increase the melting temperature of the glass.

In further aspects, the $P_2O_5$ can be present in any amount from 0 mol % to about 5 mol %, including exemplary values of about 0.01 mol %, about 0.05 mol %, about 0.1 mol %, about 0.5 mol %, about 1 mol %, about 2 mol %, about 3 mol %, about and 4 mol %. It is understood that $P_2O_5$ can be present in any amount having a value between any two foregoing values, for example, from 0 mol % to about 3 mol %, or from about 0.1 mol % to about 5 mol %, or from about 1 mol % to about 5 mol %. In still further aspects, $P_2O_5$ can be a nucleation agent to produce bulk nucleation. Without wishing to be bound by any theory, it is hypothesized that if the concentration of $P_2O_5$ is low, crystals can grow on the surface instead of in bulk. In such aspects, it is also assumed that the crystal growth rate is low. Without wishing to be bound by theory, it is further hypothesized that if the concentration of $P_2O_5$ is high, transparency can be affected, as the crystal growth rate can be fast and hard to control.

In further aspects, the $Na_2O$ can be present in any amount from 0 mol % to about 5 mol %, including exemplary values of about 0.01 mol %, about 0.05 mol %, about 0.1 mol %, about 0.5 mol %, about 1 mol %, about 2 mol %, about 3 mol %, about and 4 mol %. It is understood that $Na_2O$ can be present in any amount having a value between any two foregoing values, for example, from 0 mol % to about 3 mol %, or from about 0.1 mol % to about 2 mol %, or from about 1 mol % to about 5 mol %. Without wishing to be bound by any theory, it is hypothesized that $Na_2O$ can decrease the viscosity of glass and increase the glass-forming ability. Yet, in other aspects, high amounts of $Na_2O$ can decrease the crystalline to amorphous ratio and thus affect the toughness of glass-ceramics.

In still further aspects, disclosed herein are glass-ceramic composition comprising: a) $Al_2O_3$ present from about 2 mol % to about 20 mol %, b) $SiO_2$ present from about 48 mol % to about 80 mol %, c) $R'_2O$ present from greater than 0 mol % to about 45 mol %; and wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase. While in other aspects, disclosed herein are glass-ceramic composition comprising: a) $Al_2O_3$ present from about 3 mol % to about 12 mol %, b) $SiO_2$ present from about 48 mol % to about 75 mol %, c) $R'_2O$ present from greater than 0 mol % to about 45 mol %; and wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase. In certain aspects, such glass-ceramic compositions can be defined as ion-exchanged glass-ceramic compositions.

In yet further aspects, when $R'_2O$ comprises $Li_2O$, the composition can comprise a minor crystalline phase comprising a lithium silicate phase.

In still further aspects, in such ion-exchanged compositions, $SiO_2$ can be present in any amount from about 48 to about 80 mol %, including exemplary values of about 50 mol %, about 51 mol %, about 52 mol %, about 53 mol %, about 54 mol %, about 55 mol %, about 56 mol %, about 57 mol %, about 58 mol %, about 59 mol %, about 60 mol %, about 61 mol %, about 62 mol %, about 63 mol %, about 64 mol %, about 65 mol %, about 66 mol %, about 67 mol %, about 68 mol %, about 69 mol %, about 70 mol %, about 71 mol %, about 72 mol %, about 73 mol %, about 74 mol %, about 75 mol %, about 76 mol %, about 77 mol %, about 78 mol %, and about 79 mol %. It is understood that $SiO_2$ can be present in any amount having value between any two foregoing value, for example from about 45 mol % to about 75 mol %, or from about 55 mol % to about 80 mol %, or from about 65 mol % to about 80 mol %, or from about 65 mol % to about 75 mol %.

In yet other aspects, in such ion-exchanged compositions $Al_2O_3$ can be present in any amount from about 2 mol % to about 20 mol %, including exemplary values of about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, and about 19 mol %, It is understood that $Al_2O_3$ can be present in any amount having a value between any two foregoing values, for example, from about 3 mol % to about 12 mol %, or from about 5 mol % to about 15 mol %, or from about 6 mol % to about 14 mol %.

In still other aspects, in such ion-exchanged compositions, $R'_2O$ can be present in any amount from 0 mol % to about 45 mol %, including exemplary values of about 0.1 mol %, about 0.5 mol %, about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol %, about 15 mol %, about 16 mol %, about 17 mol %, about 18 mol %, about 19 mol %, about 20 mol %, about 21 mol %, about 22 mol %, about 23 mol %, about 24 mol %, about 25 mol %, about 26 mol %, about 27 mol %, about 28 mol %, about 29 mol %, about 30 mol %, about 31 mol %, about 32 mol %, about 33 mol %, about 34 mol %, about 35 mol %, about 36 mol %, about 37 mol %, about 38 mol %, about 39 mol %, about 40 mol %, about 41 mol %, about 42 mol %, about 43 mol %, and about 44 mol %. It is understood that $R'_2O$ can be present in any amount having value between any two foregoing value, for example from about 13 mol % to about 45 mol %, or from about 5 mol % to about 15 mol %, or from about 8 mol % to about 12 mol %.

Similarly to the disclosed above compositions, wherein $Al_2O_3$ is present from about 5 mol % to about 7.5 mol %, the glass-ceramic composition comprises a major crystalline phase comprising from about 20 to about 80% of the β-spodumene phase and from about 20 to about 80% of the petalite phase. While in other aspects, when $Al_2O_3$ is present from about 5 mol % to about 7.5 mol % and $Li_2O$ is present from 20 mol % to about 25 mol %, the glass-ceramic composition comprises a major crystalline phase comprising from about 20 to about 80% of the β-spodumene phase and from about 20 to about 80% of the petalite phase, and a minor phase comprises up to 10 mol % of the lithium silicate phase. In yet still, further aspects, when $Al_2O_3$ is present from about 7 mol % to about 12 mol %, the glass-ceramic composition comprises a major crystalline phase comprising from about 60% to about 90% of the β-spodumene phase and a minor crystalline phase comprising up to about 10% of the lithium silicate phase, if $R'_2O$ comprises $Li_2O$.

In still further aspects, the amount of $R'_2O$ can be adjusted to provide glass compositions exhibiting desired melting temperature and/or liquidus temperatures. Without being bound by theory, the addition of alkali oxides, for example, can increase the coefficient of thermal expansion (CTE) and/or lower the chemical durability of the glasses and/or glass-ceramics that include such precursor glass compositions. The amount of excess alkali in a glass composition can also determine the ceramming or heat treatment temperature used to form the glass-ceramics.

In still further aspects, such ion-exchanged glass-ceramic compositions can further comprise: a) from 0 mol % to about 8 mol % of $B_2O_3$, b) from 0 mol % to about 8 mol % of $ZrO_2$, c) from 0 mol % to about 5 mol % of $P_2O_5$, and d) from 0 mol % to about 5 mol % of $Na_2O$. While, in other aspects, the glass-ceramic compositions as disclosed herein can further comprise a) from 0 mol % to about 5 mol % of $B_2O_3$, b) from 0 mol % to about 3 mol % of $ZrO_2$, c) from 0 mol % to about 3 mol % of $P_2O_5$, and d) from 0 mol % to about 3 mol % of $Na_2O$.

In such exemplary aspects, the $B_2O_3$ can be present in any amount from 0 mol % to about 8 mol %, including exemplary values of about 0.01 mol %, about 0.05 mol %, about 0.1 mol %, about 0.5 mol %, about 1 mol %, about 2 mol %, about 3 mol %, about 4 mol %, about 5 mol %, about 6 mol %, and about 7 mol %. It is understood that $B_2O_3$ can be present in any amount having a value between any two foregoing values, for example, from about 0.1 mol % to about 5 mol %, from about 0.1 mol % to about 3 mol %, or from about 0.1 mol % to about 2 mol %.

In further aspects, the $ZrO_2$ can be present in any amount from 0 mol % to about 8 mol %, including exemplary values of about 0.01 mol %, about 0.05 mol %, about 0.1 mol %, about 0.5 mol %, about 1 mol %, about 2 mol %, about 3 mol %, about 4 mol %, about 5 mol %, about 6 mol %, and about 7 mol %. It is understood that $ZrO_2$ can be present in any amount having a value between any two foregoing values, for example, from 0 mol % to about 3 mol %, or from about 0.1 mol % to about 6 mol %, or from about 2 mol % to about 6 mol %.

In further aspects, the $P_2O_5$ can be present in any amount from 0 mol % to about 5 mol %, including exemplary values of about 0.01 mol %, about 0.05 mol %, about 0.1 mol %, about 0.5 mol %, about 1 mol %, about 2 mol %, about 3 mol %, about and 4 mol %. It is understood that $P_2O_5$ can be present in any amount having a value between any two foregoing values, for example, from 0 mol % to about 3 mol %, or from about 0.1 mol % to about 5 mol %, or from about 1 mol % to about 5 mol %.

In further aspects, the $Na_2O$ can be present in any amount from 0 mol % to about 5 mol %, including exemplary values of about 0.01 mol %, about 0.05 mol %, about 0.1 mol %, about 0.5 mol %, about 1 mol %, about 2 mol %, about 3 mol %, about and 4 mol %. It is understood that $Na_2O$ can be present in any amount having a value between any two foregoing values, for example, from 0 mol % to about 3 mol %, or from about 0.1 mol % to about 2 mol %, or from about 1 mol % to about 5 mol %.

In yet further aspects, any of the disclosed herein glass-ceramic compositions (both glass-ceramic compositions and ion-exchanged glass-ceramic compositions) can exhibit density from about 2.00 g/cm³ to about 2.6 g/cm³, including exemplary value of about 2.01 g/cm³, about 2.02 g/cm³, about 2.03 g/cm³, about 2.04 g/cm³, about 2.05 g/cm³, about 2.06 g/cm³, about 2.07 g/cm³, about 2.08 g/cm³, about 2.09 g/cm³, about 2.1 g/cm³, about 2.11 g/cm³, about 2.12 g/cm³, about 2.13 g/cm³, about 2.14 g/cm³, about 2.15 g/cm³, about 2.16 g/cm³, about 2.17 g/cm³, about 2.18 g/cm³, about 2.19 g/cm³, about 2.20 g/cm³, about 2.21 g/cm³, about 2.22 g/cm³, about 2.23 g/cm³, and about 2.24 g/cm³, about 2.25 g/cm³, about 2.26 g/cm³, about 2.27 g/cm³, about 2.28 g/cm³, about 2.29 g/cm³, about 2.30 g/cm³, about 2.31 g/cm³, about 2.32 g/cm³, about 2.33 g/cm³, and about 2.34 g/cm³, about 2.35 g/cm³, about 2.36 g/cm³, about 2.37 g/cm³, about 2.38 g/cm³, about 2.39 g/cm³, about 2.4 g/cm³, about 2.41 g/cm³, about 2.42 g/cm³, about 2.43 g/cm³, about 2.44 g/cm³, about 2.45 g/cm³, about 2.46 g/cm³, about 2.47 g/cm³, about 2.48 g/cm³, about 2.49 g/cm³, about 2.5 g/cm³, about 2.51 g/cm³, about 2.52 g/cm³, about 2.53 g/cm³, about 2.54 g/cm³, about 2.55 g/cm³, about 2.56 g/cm³, about 2.57 g/cm³, about 2.58 g/cm³, and about 2.59 g/cm³.

In still further aspects, any of the disclosed herein glass-ceramic compositions (both glass-ceramic compositions and ion-exchanged glass-ceramic compositions) can exhibit an average transmittance greater than about 80% over a wavelength range from about 390 nm to about 700 nm as measured for a sample prepared from the composition and having a thickness of about 2.00 mm. In such exemplary aspects, the average transmittance can be greater than about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 99.5%, and about 99.99%. In still further aspects, the average transmittance is measured over a wavelength range from about 390 nm to about 700 nm, including exemplary values of about 400 nm, about 450 nm, about 500 nm, about 550 nm, about 600 nm, and about 650 nm. It is understood that in such exemplary aspects, the glass-ceramic composition is substantially transparent. In yet other aspects, the glass-ceramic composition is transparent. In still further exemplary aspects, the glass-ceramic composition comprises a plurality of crystal grains, wherein the median size of a crystal grain is from about 20 to about 80 nm, including exemplary values of about 25 nm, about 30 nm, about 35 nm, about 40 nm, about 45 nm, about 50 nm, about 55 nm, about 60 nm, about 65 nm, about 70 nm, and about 75 nm.

In yet other aspects, any of the disclosed herein glass-ceramic compositions (both glass-ceramic compositions and ion-exchanged glass-ceramic compositions) can exhibit an average transmittance between 20% and 80% over a wavelength range from about 390 nm to about 700 nm as measured for a sample prepared from the composition and having a thickness of about 2.00 mm. In such exemplary aspects, the average transmittance is about 20%, about 25%, about 30%, about 35, about 40%, about 45%, about 50%, about 55%, about 60%, about 65%, about 70%, about 75% and about 80%. In still further aspects, the average transmittance is measured over a wavelength range from about 390 nm to about 700 nm, including exemplary values of about 400 nm, about 450 nm, about 500 nm, about 550 nm, about 600 nm, and about 650 nm. It is understood that in such exemplary aspects, the glass-ceramic composition is substantially translucent. In yet other aspects, the glass-ceramic composition is translucent. In still further exemplary aspects, the glass-ceramic composition comprises a plurality of crystal grains, wherein the median size of a crystal grain is from about 80 to about 500 nm, including exemplary values of about 100 nm, about 120 nm, about 150 nm, about 170 nm, about 200 nm, about 220 nm, about 250 nm, about 270 nm, about 300 nm, about 320 nm, about 350 nm, about 370 nm, about 400 nm, about 420 nm, about 450 nm, and about 470 nm.

In yet other aspects, any of the disclosed herein glass-ceramic compositions (both glass-ceramic compositions and ion-exchanged glass-ceramic compositions) can exhibit an average transmittance lower than 20% over a wavelength range from about 390 nm to about 700 nm as measured for a sample prepared from the composition and having a thickness of about 2.00 mm. In such exemplary aspects, the average transmittance is about 20%, about 19%, about 18%, about 17, about 16%, about 15%, about 14%, about 13%, about 12%, about 11%, about 10%, about 9%, about 8%, about 7, about 6%, about 5%, about 4%, about 3%, about 2%, and about 1%. In still further aspects, the average transmittance is measured over a wavelength range from about 390 nm to about 700 nm, including exemplary values of about 400 nm, about 450 nm, about 500 nm, about 550 nm, about 600 nm, and about 650 nm. It is understood that in such exemplary aspects, the glass-ceramic composition is substantially opaque. In yet other aspects, the glass-ceramic composition is opaque. In still further exemplary aspects, the glass-ceramic composition comprises a plurality of crystal grains, wherein the median size of a crystal grain is greater than about 500 nm, greater than about 550 nm, greater than about 600 nm, greater than about 650 nm, greater than about 700 nm, greater than about 750 nm, greater than about 800 nm, greater than about 850 nm, greater than about 900 nm, greater than about 950 nm, or greater than about 1,000 nm.

In still further aspects, any of the disclosed herein glass-ceramic compositions (both glass-ceramic compositions and ion-exchanged glass-ceramic compositions) can exhibit Vickers hardness equal to or greater than about 6.0 GPa, or greater than about 7 GPa, or greater than about 8 GPa, or greater than about 9 GPa, or greater than about 10 GPa.

In still further aspects, any of the disclosed herein glass-ceramic compositions (both glass-ceramic compositions and ion-exchanged glass-ceramic compositions) can exhibit Vickers hardness of at least about 5% greater than Vickers hardness of a standard soda lime silicate glass, or at least about 7% greater, at least about 10% greater, at least about 15% greater, at least about 20% greater, at least about 25% greater, or at least about 50% greater than Vickers hardness of a standard soda lime silicate glass.

In still further aspects, any of the disclosed herein glass-ceramic compositions (both glass-ceramic compositions and ion-exchanged glass-ceramic compositions) can exhibit a crack-resistance greater than about 0.2 kgf, about 0.4 kgf, about 0.6 kgf, about 0.8 kgf, or greater than about 1 kgf, or greater than about 1.5 kgf, greater than about 2 kgf, greater than about 5 kgf, or greater than about 10 kgf. In still further exemplary aspects, the glass-ceramic compositions (both glass-ceramic compositions and ion-exchanged glass-ceramic compositions) disclosed herein can exhibit a crack-resistance that at least 4 times higher, at least 5 times higher, at least 6 times higher, at least 7 times higher, at least 8 times higher, at least 9 times higher, or at least 10 times higher than a crack-resistance of a standard soda lime silicate glass.

In still further aspects, any of the disclosed herein glass-ceramic compositions (both glass-ceramic compositions and ion-exchanged glass-ceramic compositions) can exhibit a thermal expansion coefficient from about $40\times10^{-7}$ to about $90\times10^{-7}/^\circ$ C., including exemplary values of about $41\times10^{-7}/^\circ$ C., about $42\times10^{-7}/^\circ$ C., about $43\times10^{-7}/^\circ$ C., about $44\times10^{-7}/^\circ$ C., about $45\times10^{-7}/^\circ$ C., about $46\times10^{-7}/^\circ$ C., about $47\times10^{-7}/^\circ$ C., about $48\times10^{-7}/^\circ$ C., about $49\times10^{-7}/^\circ$ C., about $50\times10^{-7}/^\circ$ C., about $51\times10^{-7}/^\circ$ C., about $52\times10^{-7}/^\circ$ C., about $53\times10^{-7}/^\circ$ C., about $54\times10^{-7}/^\circ$ C., about $55\times10^{-7}/^\circ$ C., about $56\times10^{-7}/^\circ$ C., about $57\times10^{-7}/^\circ$ C., about $58\times10^{-7}/^\circ$ C., about $59\times10^{-7}/^\circ$ C., about $60\times10^{-7}/^\circ$ C., about $61\times10^{-7}/^\circ$ C., about $62\times10^{-7}/^\circ$ C., about $63\times10^{-7}/^\circ$ C., about $64\times10^{-7}/^\circ$ C., about $65\times10^{-7}/^\circ$ C., about $66\times10^{-7}/^\circ$ C., about $67\times10^{-7}/^\circ$ C., about $68\times10^{-7}/^\circ$ C., about $69\times10^{-7}/^\circ$ C., about $70\times10^{-7}/^\circ$ C., about $71\times10^{-7}/^\circ$ C., about $72\times10^{-7}/^\circ$ C., about $73\times10^{-7}/^\circ$ C., about $74\times10^{-7}/^\circ$ C., about $75\times10^{-7}/^\circ$ C., about $76\times10^{-7}/^\circ$ C., about $77\times10^{-7}/^\circ$ C., about $78\times10^{-7}/^\circ$ C., about $79\times10^{-7}/^\circ$ C., about $80\times10^{-7}/^\circ$ C., about $81\times10^{-7}/^\circ$ C., about $82\times10^{-7}/^\circ$ C., about $83\times10^{-7}/^\circ$ C., about $84\times10^{-7}/^\circ$ C., about $85\times10^{-7}/^\circ$ C., about $86\times10^{-7}/^\circ$ C., about $87\times10^{-7}/^\circ$ C., about $88\times10^{-7}/^\circ$ C., and about $89\times10^{-7}/^\circ$ C. It is understood that in such aspects, $^\circ$ C. is averaged over a temperature range from about 25$^\circ$ C. to about 300$^\circ$ C. It is understood that the glass-ceramic compositions can comprise any thermal expansion value between any two foregoing values.

In yet further aspects, any of the disclosed herein glass-ceramic compositions (both glass-ceramic compositions and ion-exchanged glass-ceramic compositions) comprises a glass transition temperature ($T_g$) from about 450$^\circ$ C. to about 600$^\circ$ C., including exemplary values of about 460$^\circ$ C., about 470$^\circ$ C., about 480$^\circ$ C., about 490$^\circ$ C., about 500$^\circ$ C., about 510$^\circ$ C., about 520$^\circ$ C., about 530$^\circ$ C., about 540$^\circ$ C., about 550$^\circ$ C., about 560$^\circ$ C., about 570$^\circ$ C., about 580$^\circ$ C., and about 590$^\circ$ C.

In still further aspects, any of the disclosed herein glass-ceramic compositions (both glass-ceramic compositions and ion-exchanged glass-ceramic compositions) can comprise one or more fining agents. In certain aspects, the compositions can comprise from greater than 0 mol % to about 1 mol % of a fining agent, including exemplary value of about 0.1 mole %, about 0.2 mol %, about 0.3 mol %, about 0.4 mol %, about 0.5 mol %, about 0.6 mol %, about 0.7 mol %, about 0.8 mol %, and about 0.9 mol %. It is understood that the fining agent can be present in any amount having a value between any two foregoing values.

In still further aspects, the fining agent can comprise any fining agent known in the art. In certain aspects, the fining agent can comprise a salt, a metallic oxide, or any combination thereof. In certain aspects, where the fining agent comprises a salt, such salt can comprise sulfate, chloride, iodide, bromide, or a combination thereof. Yet in further aspects, where the fining agent comprises a metal oxide, the metal oxide can comprise $CeO_2$, $SnO_2$, $Fe_2O_3$, $As_2O_3$, $Sb_2O_3$, $MnO_2$, or a combination thereof. However, in yet other aspects, the glass composition does not comprise any heavy metals. In such aspects, the glass composition is substantially free of heavy metals.

In certain aspects, the addition of the fining agent can reduce bubble formation in glass melts to reduce the population of bubbles in the glass-ceramics.

It is understood that in some aspects, any of the disclosed herein glass-ceramic compositions (both glass-ceramic compositions and ion-exchanged glass-ceramic compositions) can also comprise other components. For example, and without limitations, the disclosed compositions can comprise one or more coloring components. In such aspects, the one or more of coloring components are selected from transition metal oxides and/or rare earth metal oxide. For example, and without limitations, the one or more of coloring components can comprise $V_2O_5$, $Cr_2O_3$, $TiO_2$, $MnO_2$, NiO, ZnO, CuO, $Co_3O_4$, and combinations thereof. In aspects where the coloring components are present, these components are present in a total amount equal to or less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %. It is understood that the coloring components can be present in any amount having a value between any two foregoing values.

In still further aspects, to avoid a possible undesired coloring effect on the disclosed herein glass-ceramic compositions, some trace amounts of decolorizing agents can be added. In such aspects, the decolorizing agents can comprise one or more of sodium sulphate, selenium compounds, erbium oxide, cerium oxide, cobalt oxide, manganese oxide, and other polyvalent elements. In still further aspects, these decolorizing agents can reduce colorization through any mechanisms known in the art, including chemical and/or physical mechanisms. In yet still further aspects, these agents can be present in a total amount equal to or less than about 1 mol %, less than about 0.9 mol %, less than about 0.8 mol %, less than about 0.7 mol %, less than about 0.6 mol %, less than about 0.5 mol %, less than about 0.4 %, less than about 0.3 mol %, less than about 0.2 mol %, less than about 0.1 mol %, less than about 0.05 mol %, or less than about 0.01 mol %. It is understood that the decolorizing agents can be present in any amount having a value between any two foregoing values.

In yet further aspects, any of the disclosed herein glass-ceramic compositions can be ion-exchangeable.

In still further aspects, such ion-exchanged glass-ceramic compositions can also be substantially transparent. While in other aspects, such ion-exchanged glass-ceramic compositions are substantially translucent. While in still further aspects, such ion-exchanged glass-ceramic compositions are substantially opaque.

In still further aspects, these ion-exchanged glass-ceramic compositions can comprise a compressive stress layer. It is understood that such a layer is formed by an ion-exchange process.

In still further aspects, when the glass-ceramic compositions comprise $R'_2O$, and when $R'_2O$ comprises $Ag_2O$, and/or $Cu_2O$, and/or $CuO$, such compositions can also exhibit antimicrobial, antiviral, antibacterial, and/or antifungal properties.

In still further aspects, the glass compositions described herein can be substantially transparent in a wavelength range from about 400 nm to about 800 nm. In some exemplary and unlimiting aspects, the glass compositions exhibit percent transmittance greater than about 87%, greater than about 88%, greater than about 89%, greater than about 90%, greater than about 91%, greater than about 92%, greater than about 93%, greater than about 94%, greater than about 95%, greater than about 96%, greater than about 97%, greater than about 98%, greater than about 99%, over a wavelength range from about 400 nm to about 800 nm, including an exemplary value of about 430 nm, about 450 nm, about 470 nm, about 500 nm, about 530 nm, about 550 nm, about 570 nm, about 600 nm, about 630 nm, about 650 nm, about 670 nm, about 700 nm, about 730 nm, about 750 nm, and about 770 nm.

Articles

In certain aspects, disclosed herein are articles comprising any of the disclosed above compositions. For example and without limitations disclosed herein are articles comprising: a) from about 2 mol % to about 20 mol % of $Al_2O_3$, b) from about 2 mol % to about 45 mol % of $Li_2O$; and from about 48 mol % to about 80 mol % of $SiO_2$; having a β-spodumene phase and a lithium silicate crystalline phase, and optionally a petalite phase. While in other aspects, disclosed herein are articles comprising: a) from about 3 mol % to about 12 mol % of $Al_2O_3$, b) from about 13 mol % to about 45 mol % of $Li_2O$; and from about 48 mol % to about 75 mol % of $SiO_2$; having a β-spodumene phase and a lithium silicate crystalline phase, and optionally a petalite phase.

While in still further aspects, disclosed herein are articles comprising: a) from about 2 mol % to about 20 mol % of $Al_2O_3$, b) $SiO_2$ present from about 48 mol % to about 80 mol %; and $R'_2O$ present from greater than 0 mol % to about 45 mol %; wherein $R'_2O$ comprises $Li_2O$, $Na_2O$, $K_2O$, $Ag_2O$, $Cu_2O$, $CuO$, or a combination thereof, wherein the composition comprises a major crystalline phase comprising a β-spodumene phase, and optionally, a petalite phase. While in other aspects, disclosed herein are articles comprising: a) from about 3 mol % to about 12 mol % of $Al_2O_3$, b) $SiO_2$ present from about 48 mol % to about 75 mol %; and $R'_2O$ present from greater than 0 mol % to about 45 mol %; wherein $R'_2O$ comprises $Li_2O$, $Na_2O$, $K_2O$, $Ag_2O$, $Cu_2O$, $CuO$, or a combination thereof, wherein the composition comprises a major crystalline phase comprising a β-spodumene phase, and optionally, a petalite phase.

In certain aspects, also disclosed are glass-ceramic articles comprising compositions having the compressive stress layers. In such exemplary aspects, the compressive stress layer can extend from a surface of the article to a depth of the compressive stress layer, wherein the depth is from about 1 μm to about 100 μm, including exemplary values of about 2 μm, about 5 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, and about 95 μm. In yet further aspects, the depth of the compressive layer can be up to about 25% of a thickness of the glass-ceramic article, including exemplary values of about 1%, about 5%, about 10%, about 15%, and about 20% of a thickness of the glass-ceramic article.

In still further aspects, the compressive stress layer can exhibit a compressive stress of at least about 10 MPa, at least about 20 MPa, at least about 50 MPa, at least about 80 MPa, at least about 100 MPa, at least about 120 MPa, at least about 150 MPa, at least about 180 MPa, at least about 200 MPa, at least about 210 MPa, or at least about 250 MPa.

In still further aspects, the articles disclosed herein exhibit a ring-on-ring strength of at least 10%, or at least 15%, or at least 20%, or at least 25%, or at least 30%, or at least 35%, or at least 40%, or at least 45%, or at least 50% higher than that of standard soda lime silicate glass tested under similar conditions.

In yet further aspects, the articles can be substantially transparent. While in other aspects, the articles can be substantially translucent. While still in other aspects, the articles can be substantially opaque. In still further aspects, the articles can comprise compositions comprising a coloring component. In such exemplary aspects, the articles can have a color.

In still further aspects, the articles can comprise any known in the art articles that require the disclosed herein mechanical and optical properties. Yet in other aspects, the articles disclosed herein can comprise a hollowware, tableware, container, plate, sheet (including sheet prepared via the float process), cookware, powder, fiber, cones, spheres, blades, or any combination thereof. In still further aspects, the articles disclosed herein can be formed by any process. For example, the articles can be formed by a float or flat press process, a press-and-blow process, a blow-and-blow process, or any combination thereof. While in still further aspects, disclosed herein articles can also be used in a variety of electronic devices or portable computing devices, light diffusers, automotive, appliances, medical industry, food industry, and even architectural applications. In still further aspects, the articles disclosed herein can have known in the art shape or configuration.

Also disclosed herein is a tableware comprising any of the disclosed above glass-ceramic compositions. In certain aspects and without limitations, the tableware can comprise a blown and/or pressed product. In still further exemplary aspects, the tableware can be formed by a press process, a press-and-blow process, a blow-and-blow process, or any combination thereof. In yet other aspects, disclosed herein is a hollowware comprising any of the disclosed above glass-ceramic compositions. In certain aspects and without limitations, the hollowware can be formed by a press-and-blow process, a blow-and-blow process, or a combination thereof. Also disclosed herein is a cookware comprising any of the disclosed above glass-ceramic compositions. In still further aspects, disclosed herein is a powder comprising any of the disclosed above glass-ceramic compositions. In certain aspects and without limitations, the cookware can be formed by a press process, a press-and-blow process, a blow-and-blow process, or any combination thereof. While in other aspects, disclosed herein is a fiber comprising any of the disclosed above glass-ceramic compositions. In certain aspects and without limitations, the fiber can comprise a continuous or discontinuous fiber product or a fiberglass reinforced composite.

Methods

Also disclosed herein are methods of making the disclosed compositions and the disclosed articles. In certain aspects, disclosed herein is a method comprising: a) forming a mixture comprising from about 2 mol % to about 20 mol % of $Al_2O_3$, from about 2 mol % to about 45 mol % of $Li_2O$; and from about 48 mol % to about 80 mol % of $SiO_2$; b) forming a homogeneous composition; and c) ceramming the homogeneous composition to form a glass-ceramic composition.

Yet in other aspects, disclosed herein is a method comprising: a) forming a mixture comprising from about 3 mol % to about 12 mol % of $Al_2O_3$, from about 13 mol % to about 45 mol % of $Li_2O$; and from about 48 mol % to about 75 mol % of $SiO_2$; b) forming a homogeneous composition; and c) ceramming the homogeneous composition to form a glass-ceramic composition.

It is understood that $Al_2O_3$, $Li_2O$, and $SiO_2$ can be present in any amounts as disclosed in the above-described compositions In still further aspects, the mixture formed by the methods disclosed herein can further comprise from 0 mol % to about 8 mol % of $ZrO_2$, or from 0 mol % to about 5 mol % of $P_2O_5$, or a combination thereof. While in other aspects, the mixture formed by the methods disclosed herein can further comprise from 0 mol % to about 3 mol % of $ZrO_2$, or from 0 mol % to about 3 mol % of $P_2O_5$, or a combination thereof. It is understood that both $ZrO_2$ and $P_2O_5$ can be present in any amounts as disclosed in the above-described compositions.

In yet further aspects, the step of forming the homogenous composition comprises melting the mixture in a furnace at a temperature from about 1300° C. to about 1,700° C. for a first predetermined time. In such temperature the temperature in the furnace can be any temperature in a range from about 1,300° C. to about 1,700° C., including exemplary values of about 1,310° C., about 1,320° C., about 1,330° C., about 1,340° C., about 1350° C., about 1,360° C., about 1,370° C., about 1,380° C., about 1,390° C., about 1,400° C., about 1,410° C., about 1,420° C., about 1,430° C., about 1,440° C., about 1,450° C.; about 1,460° C., about 1,470° C., about 1,480° C., about 1,490° C., about 1,500° C., about 1,510° C.; about 1,520° C., about 1,530° C., about 1,540° C., about 1,550° C.; about 1,560° C., about 1,570° C., about 1,580° C., about 1,590° C., about 1,600° C., about 1,610° C.; about 1,620° C., about 1,630° C., about 1,640° C., about 1,650° C.; about 1,660° C., about 1,670° C., about 1,680° C., and about 1,690° C.

In still further aspects, the methods disclosed herein can further comprise a step of annealing at a temperature from about 450° C. to about 700° C., including exemplary values of about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., and about 690° C.

In yet further aspects, the step of ceramming comprises heating the homogenous composition at a nucleation temperature for a second predetermined time. In such exemplary aspects, the nucleation temperature is from 450° C. to about 700° C., including exemplary values of about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 620° C., about 630° C., about 640° C., about 650° C., about 660° C., about 670° C., about 680° C., about 690° C.

In still further aspects, in the methods disclosed herein, the step of ceramming further comprises a step of heating the composition to a crystallization temperature at a rate from about 5° C./min to about 15° C./min and keeping the composition at the crystallization temperature for a third predetermined time. In such exemplary aspects, the heating is performed at a rate from about 5° C./min to about 15° C./min, including exemplary aspects, of about 6° C./min, about 7° C./min, about 8° C./min, about 9° C./min, about 10° C./min, about 11° C./min, about 12° C./min, about 13° C./min, and about 14° C./min.

In still further aspects, the crystallization temperature is from about 580° C. to about 800° C., including exemplary values of about 590° C., about 600° C., about 610° C., about 620° C., about 630° C., about 640° C., about 650° C., about 660° C., about 670° C., about 680° C., about 690° C., about 700° C., about 710° C., about 720° C., about 730° C., about 740° C., about 750° C., about 760° C., about 770° C., about 780° C., and about 790° C.

It is understood that one skilled in the art can adjust the nucleation and crystallization temperatures to accommodate the different glass compositions within the above-described range.

In yet further aspects, the first predetermined time is from about 0.5 hours to about 20 hours, including exemplary values of about 1 hour, about 1.5 hours, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 9.5 hours, about 10 hours, about 10.5 hours, about 11 hours, about 11.5 hours, about 12 hours, about 12.5 hours, about 13 hours, about 13.5 hours, about 14 hours, about 14.5 hours, about 15 hours, about 15.5 hours, about 16 hours, about 16.5 hours, about 17 hours, about 17.5 hours, about 18 hours, about 18.5 hours, about 19 hours, and about 19.5 hours.

In yet further aspects, the first predetermined time is from about 3 hours to about 5 hours, including exemplary values of about 3.1 hours, about 3.2 hours, about 3.3 hours, about 3.4 hours, about 3.5 hours, about 3.6 hours, about 3.7 hours, about 3.8 hours, about 3.9 hours, about 4.0 hours, about 4.1 hours, about 4.2 hours, about 4.3 hours, about 4.4 hours, about 4.5 hours, about 4.6 hours, about 4.7 hours, about 4.8 hours, and about 4.9 hours.

In yet further aspects, the second predetermined time is from about 0.5 hours to about 20 hours, including exemplary values of about 1 hour, about 1.5 hours, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 9.5 hours, about 10 hours, about 10.5 hours, about 11 hours, about 11.5 hours, about 12 hours, about 12.5 hours, about 13 hours, about 13.5 hours, about 14 hours, about 14.5 hours, about 15 hours, about 15.5 hours, about 16 hours, about 16.5 hours, about 17 hours, about 17.5 hours, about 18 hours, about 18.5 hours, about 19 hours, and about 19.5 hours.

In yet further aspects, the second predetermined time is from about 3 hours to about 5 hours, including exemplary values of about 3.1 hours, about 3.2 hours, about 3.3 hours, about 3.4 hours, about 3.5 hours, about 3.6 hours, about 3.7 hours, about 3.8 hours, about 3.9 hours, about 4.0 hours, about 4.1 hours, about 4.2 hours, about 4.3 hours, about 4.4 hours, about 4.5 hours, about 4.6 hours, about 4.7 hours, about 4.8 hours, and about 4.9 hours.

In yet further aspects, the third predetermined time is from about 0.5 hours to about 20 hours, including exemplary values of about 1 hour, about 1.5 hours, about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, about 9.5 hours, about 10 hours, about 10.5 hours, about 11 hours, about 11.5 hours, about 12 hours, about 12.5 hours, about 13 hours, about 13.5 hours, about 14 hours, about 14.5 hours, about 15 hours, about 15.5 hours, about 16 hours, about 16.5 hours, about 17 hours, about 17.5 hours, about 18 hours, about 18.5 hours, about 19 hours, and about 19.5 hours.

In yet further aspects, the third predetermined time is from about 3 hours to about 5 hours, including exemplary values of about 3.1 hours, about 3.2 hours, about 3.3 hours, about 3.4 hours, about 3.5 hours, about 3.6 hours, about 3.7 hours, about 3.8 hours, about 3.9 hours, about 4.0 hours, about 4.1 hours, about 4.2 hours, about 4.3 hours, about 4.4 hours, about 4.5 hours, about 4.6 hours, about 4.7 hours, about 4.8 hours, and about 4.9 hours.

In yet further aspects, the first, second, and/or third predetermined times can be the same or different.

In certain aspects, in the methods disclosed herein, $P_2O_5$ can behave as a nucleation agent. As used herein, the term a "nucleation agent" refers to a component in the glass-ceramics (and/or the precursor glass composition and/or glass that includes such a composition) that serves as the starting point of the nuclei itself (i.e., is a discontinuity or defect in the homogenous or amorphous phase from which the crystal phase is generated), and does not require other components to promote nucleation. It is understood that in other exemplary aspects, also $TiO_2$ and/or $ZrO_2$ can also be used as the nucleation agents.

While in other aspects, $ZrO_2$ can be a crystal size growth-limiting agent.

Also disclosed herein are aspects where the glass-ceramic compositions formed by the disclosed herein methods can comprise β-spodumene phase, optionally petalite phase, and a lithium silicate crystalline phase.

In still further aspects, the glass-ceramic composition formed by the disclosed methods can comprise $Al_2O_3$ in an amount from about 5 mol % to about 7.5 mol %, including exemplary values of about 5.1 mol %, about 5.2 mol %, about 5.3 mol %, about 5.4 mol %, about 5.5 mol %, about 5.6 mol %, about 5.7 mol %, about 5.8 mol %, about 5.9 mol %, about 6.0 mol %, about 6.1 mol %, about 6.2 mol %, about 6.3 mol %, about 6.4 mol %, about 6.5 mol %, about 6.6 mol %, about 6.7 mol %, about 6.8 mol %, about 6.9 mol %, about 6.9 mol %, about 7.0 mol %, about 7.1 mol %, about 7.2 mol %, about 7.3 mol %, and about 7.4 mol %. In such exemplary values, the glass-ceramic article comprises a major crystalline phase comprising from about 20 to about 80% of the β-spodumene phase, including exemplary values of 25%, about 30%, about 35%, about 40%, about 45%, about 50%, about 55%, about 60%, about 65%, about 70%, and about 75% of the β-spodumene phase. In still further aspects, the major phase can comprise from about 20 to about 80% of the petalite phase 25%, about 30%, about 35%, about 40%, about 45%, about 50%, about 55%, about 60%, about 65%, about 70%, and about 75% of the β-spodumene phase. In still further aspects, such compositions can comprise a minor crystalline phase comprising up to about 10% of the lithium silicate phase, including exemplary values of about 0.01%, about 0.05%, about 0.1%, about 0.5%, about 1%, about 2%, about 3%, about 4%, about 5%, about 6%, about 7%, about 8%, about 9%, about 9.5, and about 9.99%.

In yet further exemplary aspects, when $Al_2O_3$ is present from about 5 mol % to about 7.5 mol %, $Li_2O$ can be present from about 20 mol % to about 25 mol %, including exemplary values of about 21 mol %, about 21.5 mol %, about 22 mol %, about 22.5 mol %, about 23 mol %, about 23.5 mol %, about 24 mol %, and about 24.5 mol %.

In still further aspects, the glass-ceramic composition formed by the disclosed methods can comprise $Al_2O_3$ in an amount from about 7 mol % to about 12 mol %, including exemplary values of about 7.1 mol %, about 7.2 mol %, about 7.3 mol %, about 7.4 mol %, about 7.5 mol %, about 7.6 mol %, about 7.7 mol %, about 7.8 mol %, about 7.9 mol %, about 8.0 mol %, about 8.1 mol %, about 8.2 mol %, about 8.3 mol %, about 8.4 mol %, about 8.5 mol %, about 8.6 mol %, about 8.7 mol %, about 8.8 mol %, about 8.9 mol %, about 9.0 mol %, about 9.1 mol %, about 9.2 mol %, about 9.3 mol %, and about 9.4 mol %, about 9.5 mol %, about 9.6 mol %, about 9.7 mol %, about 9.8 mol %, about 9.9 mol %, about 10.0 mol %, about 10.1 mol %, about 10.2 mol %, about 10.3 mol %, about 10.4 mol %, about 10.5 mol %, about 10.6 mol %, about 10.7 mol %, about 10.8 mol %, about 10.9 mol %, about 11.00 mol %, about 11.1 mol %, about 11.2 mol %, about 11.3 mol %, about 11.4 mol %, about 11.5 mol %, about 11.6 mol %, about 11.7 mol %, about 11.8 mol %, and about 11.9 mol %. In such exemplary aspects, the glass-ceramic composition comprises a major crystalline phase comprising from about 60% to about 90% of the β-spodumene phase and a minor crystalline phase comprising up to about 10% of the lithium silicate phase. In such aspects, the major crystalline phase can comprise from about 60% to about 90% of the β-spodumene phase, including exemplary values of about 65%, about 70%, about 75%, about 80%, and about 85% of the β-spodumene phase. While in other aspects, the minor crystalline phase comprising up to about 10% of the lithium silicate phase, including exemplary values of greater than 0%, about 0.01%, about 0.05%, about 0.1%, about 0.5%, about 1%, about 2%, about 3%, about 4%, about 5%, about 6%, about 7%, about 8%, about 9%, about 9.5%, about 9.9%, and about 9.99%. In still further aspects, when the lithium silicate crystalline phase is present, it can comprise a lithium metasilicate crystalline phase.

In still further aspects, the mixture formed by the disclosed herein compositions can further comprise from about from 0 mol % to about 8 mol % of $B_2O_3$, and from 0 mol % to about 8 mol % of $Na_2O$. While in still further aspects, the mixture formed by the disclosed herein compositions can further comprise from about from 0 mol % to about 5 mol % of $B_2O_3$, and from 0 mol % to about 3 mol % of $Na_2O$. It is understood that both $B_2O_3$ and $Na_2O$ can be present in any amounts, as disclosed in the above-described compositions.

In still further aspects, the methods disclosed herein can comprise a step of ion-exchange treatment comprising placing the glass-ceramic composition into a molten salt bath. In such aspects, the molten salt bath can comprise any ions that can be used for an ion-exchange of the glass-ceramic composition. In certain aspects, the molten bath can comprise sodium, potassium, silver, or copper (I) ions, or a combination thereof. In still other aspects, the ion-exchange treatment can be performed at conditions effective to provide an ion-exchanged glass-ceramic composition.

In still further aspects, the molten bath can comprise any of the disclosed ions or their mixtures. In certain aspects, the conditions effective to provide the ion-exchanged glass-ceramic composition comprise exposure of the glass-ceramic composition to a molten salt at a temperature from about 380° C. to about 500° C., including exemplary values of about 390° C., about 400° C., about 410° C., about 420° C., about 430° C., about 440° C., about 450° C., about 460° C., about 470° C., about 480° C., and about 490° C. and for a time period from about 4 hours to about 20 hours, including exemplary values of about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, and about 19 hours.

In some further exemplary and unlimiting aspects, the step of ion exchange treatment can be done after the step of ceramming.

It is further understood that in aspects disclosed herein, the step of ion-exchange treatment can comprise placing the disclosed herein composition in a first molten bath comprising one or more molten oxides and forming a first ion-exchanged composition. While in other aspects, the methods can further comprise placing the first-ion exchanged composition in a second bath comprising one or more molten oxide and forming a second ion-exchanged composition, and so on until the desired ion-exchanged composition is formed. It is understood that in these exemplary and unlimiting aspects, the first and the second molten bath compositions can comprise the same or different molten oxides. In yet other aspects, the desired ion-exchanged composition can be formed in one step. In some exemplary aspects, the molten bath comprising potassium (K) ions (or silver (Ag) or copper (Cu) (I)) or Cu (II) can replace sodium (Na) ions or lithium (Li) ions in the glass-ceramic composition depending on the temperature conditions. In yet other exemplary aspects, the molten bath comprising sodium (Na) ions can further replace lithium (Li) ions in the glass-ceramic composition depending on the temperature conditions. In still further aspects, other alkali metal ions such as cesium or rubidium can also be present. In yet other exemplary and unlimiting aspects, the ion-exchange can also be done with divalent metal ions, such as calcium, barium, or magnesium, if desired. It is also understood that the molten baths can comprise any known in the art salts of the desired metal ions, for example, the salts can comprise nitrates, sulfates, halides, and the like.

It is further understood that any known in the art mechanisms of the ion-exchange can be contemplated. In certain aspects, larger ions in the composition can be replaced with the smaller ions in the bath. Yet, in further aspects, the smaller ions the compositions are replaced with larger ions on the bath. Such ion-exchange processes can be controlled by tuning the temperature and exposure time.

In yet further aspects, when the bath comprises silver or copper ions, the formed ion-exchanged compositions can exhibit antimicrobial, antibacterial, antifungal, or antiviral properties to the material.

In still further aspects, the ion-exchanged glass-ceramic composition comprises: a) $Al_2O_3$ present from about 2 mol % to about 20 mol %; b) $SiO_2$ present from about 48 mol % to about 80 mol %; c) $R'_2O$ present from greater than 0 mol % to about 45 mol %; and wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase. While yet on other aspects, the ion-exchanged glass-ceramic composition comprises: a) $Al_2O_3$ present from about 3 mol % to about 12 mol %; b) $SiO_2$ present from about 48 mol % to about 75 mol %; c) $R'_2O$ present from greater than 0 mol % to about 45 mol %; and wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase. It is understood that any of the components disclosed herein can comprise any amounts as disclosed in mentioned above compositions.

In still further aspects, the methods disclosed herein provide for the ion-exchanged glass-ceramic composition comprising a compressive stress layer. It is understood that the compressive stress layer formed by the disclosed methods can exhibit any properties described above and have any thickness or depth as described above. In yet further aspects, the properties of the compressive stress layer can be tuned by various ion-exchange treatment steps, such as a single ion-exchange step or multiple ion-exchange procedures, as described above.

It is further understood that in certain aspects, the amount and a type of ions added through the ion-exchange can affect the transparency of the composition. Yet, in other aspects, the amount and a type of ions added through the ion-exchange can affect the coefficient of thermal expansion (CTE) of the composition. Without being bound by theory, the addition of alkali oxide, for example, can increase the coefficient of thermal expansion (CTE) and/or lower the chemical durability of the glasses and/or glass-ceramics.

In still further aspects, the glass-ceramic compositions and the ion-exchanged glass-ceramic compositions can exhibit any of the disclosed above characteristics and properties. In such exemplary aspects, these compositions can be transparent, translucent, or opaque and have any of the disclosed above medium grain sizes.

In still further aspects, the methods disclosed herein comprise a step of forming a glass-ceramic article. Any known in the art methods of forming or shaping an article can be utilized. For example, and without limitation, the methods of forming a glass-ceramic article can comprise down drawing (by either a slot draw or fusion draw process), float processing, or thin rolling the glass. In yet other aspects, the methods can comprise shaping the glass or glass-ceramic to any desired shape. Various shaping methods can also be used, such as casting, molding, pressing, rolling, floating, and the like. In yet further aspects, the articles disclosed herein can be formed by a float/flat glass press process, a press-and-blow process, a blow-and-blow process, or any combination thereof.

In still further aspects, the articles formed by the disclosed herein methods can comprise a hollowware, tableware, container, plate, sheet, float/flat sheet, cookware, powder, fiber, cones, spheres, blades, or any combination thereof.

EXAMPLES

The following examples are put forth so as to provide those of ordinary skill in the art with a complete disclosure and description of how the compounds, compositions, articles, devices, and/or methods claimed herein are made and evaluated and are intended to be purely exemplary and are not intended to limit the disclosure. Efforts have been made to ensure accuracy with respect to numbers (e.g., amounts, temperature, etc.), but some errors and deviations should be accounted for.

The LAS glass-ceramics samples were prepared using the powder of $Li_2CO_3$ (Alfa Aesar, USA, 99%), $SiO_2$ (Alfa Aesar, USA, 99.5%), $Al_2O_3$ (Alfa Aesar, USA, 99.5%), $H_3BO_3$ (Acros Organics, USA, 99+%), $Na_2CO_3$ (J. T. Baker, USA), $Al(PO_3)_3$ (Alfa Aesar, USA), $ZrO_2$ (Fisher Chemical, USA). The compositions of $Li_2CO_3$, $SiO_2$, and $Al_2O_3$ are mainly based on the phase diagram of $SiO_2$—$Al_2O_3$—$Li_2O$ (as shown in FIG. 1, M. Krishna Murthy et al., Phase equilibria in the system lithium metasilicate—β-eucryptite, J. Am. Ceram. Soc. 37 (1) (1954) 14-17). As the compositions of the residue glass are different from those of crystals, the gradient of $Li_2O$ and $Al_2O_3$ was investigated to maximize the percent of petalite and β-spodumene crystals in final glass-ceramics. $P_2O_5$ was used as a nucleation agent to introduce bulk nucleation and accelerate the nucleation rate of crystal phases, and $ZrO_2$ was used to limit the crystal size to obtain transparency. Different amounts of $P_2O_3$ and $ZrO_2$ were investigated to change numbers and sizes of crystals in order to optimize transparency and increase mechanical strength. $B_2O_3$ and $Na_2O$ were used to promote glass-forming abilities. The compositions of the various glass-ceramic samples as prepared herein are shown in Table 1.

In this example, mixtures of 200 g powders were double melted in a platinum crucible at 1,550° C. and kept for 3 and 5 h for homogenization and fining. Molten glasses were poured on a stainless-steel plate, annealed at 520° C. for more than 8 h, and slowly cooled to room temperature in the furnace to release thermal stress. The homogeneity was verified using Polariscope to avoid unwanted nucleation and crystal growth in glass-ceramics.

Glass samples were cut into small pieces and prepared for ceramming. Different temperatures were selected for nucleation temperature, in a small range above the glass transition temperature ($T_g$) measured by Differential Scanning calorimetry (DSC). Different were selected for crystal growth, according to the crystallization temperature measured by DSC. Small glass pieces were kept at nucleation temperature for 4 h, increased to crystal growth temperature at 10° C./min, held for 4 h for crystal growth, and slowly cooled down to room temperature in the furnace.

Glass samples were ground into a powder and measured by Inductively Coupled Plasma Atomic Emission Spectroscopy (ICP-AES) to investigate the compositional differences between glass samples and batch materials. DSC measurement performed heat-cool-heat experiments at 10° C./min using SDT 600 from TA company to learn glass transition temperature and crystallization temperature. The cooling process provides a known thermal history, and $T_g$ was recorded as the onset temperature in the glass transition area. Viscosity-temperature parameters were measured using a rotational viscometer (VIS 403, TA Instruments) at a 20 K/min cooling rate in the range of $10^{0.7}$-$10^{6.6}$ Pa·s. The observed high cooling rate was assumed to be due to the crystallization of the supercooled liquid of lithium aluminosilicate glass.

Densities of both glass and glass-ceramics were measured using the Archimedes method with distilled water as a liquid medium at room temperature. X-ray diffraction (XRD) patterns (2θ from 10° to 70°) were obtained to identify crystal phases and calculate the percent of different crystals using PANalytical Empryean X-ray Diffractometer with Cu $K_\alpha$ radiation (40 kV & 40 mA) source.

Ultraviolet-visible (UV-VIS) transmittance spectra in a range from 250 to 800 nm were obtained using Perkin-Elmer Lambda 950 UV-VIS-NIR Spectrophotometer. The glass-ceramics samples for UV-VIS spectra were optically polished to equal thickness (2.0±0.1 mm).

TABLE 1

The composition of LAS glass-ceramics batch materials.

| | LAS1-6 mol % | LAS7 mol % | LAS8 mol % | LAS9 mol % | LAS10 mol % | LAS11 mol % | LAS12 mol % |
|---|---|---|---|---|---|---|---|
| $SiO_2$ | 68.3 | 69.5 | 67.1 | 65.9 | 68.3 | 68.3 | 68.3 |
| $Al_2O_3$ | 9.4 | 9.4 | 9.4 | 9.4 | 5.4 | 7.4 | 3.4 |
| $B_2O_3$ | 0.6 | 0.6 | 0.6 | 0.6 | 0.6 | 0.6 | 0.6 |
| $Li_2O$ | 18.5 | 18.5 | 18.5 | 18.5 | 22.5 | 20.5 | 24.5 |
| $Na_2O$ | 1.6 | 1.6 | 1.6 | 1.6 | 1.6 | 1.6 | 1.6 |
| $K_2O$ | 0.0 | 0.0 | 0.0 | 0.0 | 0.0 | 0.0 | 0.0 |
| $ZrO_2$ | 1.2 | 0.0 | 2.4 | 3.6 | 1.2 | 1.2 | 1.2 |
| $P_2O_5$ | 0.6 | 0.6 | 0.6 | 0.6 | 0.6 | 0.6 | 0.6 |
| Total | 100 | 100 | 100 | 100 | 100 | 100 | 100 |

| | LAS13 mol % | LAS14 mol % | LAS15 mol % | LAS16 mol % | LAS17 mol % | LAS18 mol % | LAS19 mol % |
|---|---|---|---|---|---|---|---|
| $SiO_2$ | 68.3 | 67.1 | 67.1 | 67.1 | 68.9 | 66.9 | 64.9 |
| $Al_2O_3$ | 11.4 | 7.4 | 5.4 | 3.4 | 5.4 | 5.4 | 5.4 |
| $B_2O_3$ | 0.6 | 0.6 | 0.6 | 0.6 | 0.0 | 2.0 | 4.0 |
| $Li_2O$ | 16.5 | 20.5 | 22.5 | 24.5 | 22.5 | 22.5 | 22.5 |
| $Na_2O$ | 1.6 | 1.6 | 1.6 | 1.6 | 1.6 | 1.6 | 1.6 |
| $K_2O$ | 0.0 | 0.0 | 0.0 | 0.0 | 0.0 | 0.0 | 0.0 |
| $ZrO_2$ | 1.2 | 2.4 | 2.4 | 2.4 | 1.2 | 1.2 | 1.2 |
| $P_2O_5$ | 0.6 | 0.6 | 0.6 | 0.6 | 0.6 | 0.6 | 0.6 |
| Total | 100 | 100 | 100 | 100 | 100 | 100 | 100 |

| | LAS20 mol % | LAS21 mol % | LAS22 mol % | LAS23 mol % | LAS24 mol % | LAS25 mol % | LAS28 mol % |
|---|---|---|---|---|---|---|---|
| $SiO_2$ | 68.9 | 67.7 | 67.1 | 67.7 | 68.3 | 68.3 | 69.1 |
| $Al_2O_3$ | 5.4 | 9.4 | 5.4 | 5.4 | 6.4 | 4.4 | 7.4 |
| $B_2O_3$ | 0.6 | 0.6 | 0.6 | 0.6 | 0.6 | 0.6 | 0.6 |
| $Li_2O$ | 22.5 | 18.5 | 22.5 | 22.5 | 21.5 | 23.5 | 18.5 |
| $Na_2O$ | 1.6 | 1.6 | 1.6 | 1.6 | 1.6 | 1.6 | 1.6 |
| $K_2O$ | 0.0 | 0.0 | 0.0 | 0.0 | 0.0 | 0.0 | 0.0 |
| $ZrO_2$ | 1.2 | 1.2 | 1.2 | 1.2 | 1.2 | 1.2 | 1.2 |
| $P_2O_5$ | 0.0 | 1.2 | 1.8 | 1.2 | 0.6 | 0.6 | 1.8 |
| Total | 100 | 100 | 100 | 100 | 100 | 100 | 100 |

Vickers hardness and toughness were determined by using a Mitutoyo HM-200 microhardness tester. At least 10 indents were measured on the polished surface of each sample under a 136° diamond indenter. The hardness was measured under 0.1 kgf (1 kgf=9.8 N) and calculated following Equation (1):

$$HV = 0.0182 \frac{F}{d_1 d_2};\tag{1}$$

where HV is the Vickers hardness in GPa, F is the load in kgf, and $d_1$ and $d_2$ are the lengths of two diagonals left by indenter in mm. Vickers toughness was measured under 0.8 kgf and calculated using Equation (2):

$$K_{IC} = 0.016 \times 10^{-6} \left(\frac{E}{H}\right)^{0.5} \cdot \left(\frac{P}{c_0^{1.5}}\right);\tag{2}$$

where $K_{IC}$ is the indentation fracture toughness in MPa·m$^{0.5}$, E is the elastic Young's modulus in GPa, H is the hardness in GPa, P is the load in N, $c_0$ is half of the diagonal crack length in m. Elastic modulus is measured using nanoindentation. Indentation test is used for fracture toughness, instead of three-point bending test in current research, for the reason of low dimensional requests and fewer sample numbers.

It was found that the number of cracks in the indentation test increases with increasing load following the sigmodal-like shape. Weibull's equation was used to fit the curve of sodium aluminosilicate glasses by Yoshida et al, and calcium aluminosilicate glasses by Pönitzsch et al. (Yoshida, A. et al., Crack initiation behavior of sodium aluminosilicate glasses. *J. of Non-Cryst. Solids* 344 (1-2) (2004) 37-43; A. Pönitzsch et al., Bulk elastic properties, hardness, and fatigue of calcium aluminosilicate glasses in the intermediate-silica range. *J. of Non-Cryst. Solids* 434 (2016) 1-12).

Weibull's equation is shown in Equation (3):

$$F(P) = 1 - \exp\left[-\left(\frac{P}{\beta}\right)^m\right]\tag{3}$$

where F(P) is the probability of cracks (the number of ideal cracks divided by four), P is the load, $\beta$ is the scale parameter, and m is the Weibull modulus. The crack resistance is defined as F(P)=0.5, meaning the load required to generate two out of four cracks.

Linear thermal expansion coefficient (CTE) of glass-ceramics samples were obtained under 0.0500 N force using a Thermomechanical Analyzer (TMA) Q400 from the TA company. The samples were ground to 6×6×20 mm, and heated from room temperature to 300° C. at a 5° C./min heating rate.

Example 2

Glass Composition

It was found that the composition from ICP data is very close to that of batch materials, with an error of less than 0.5 mol % for major oxides and 0.2 mol % for minor oxides. Due to the evaporation loss, the amounts of $P_2O_5$, $Li_2O$, $B_2O_3$ were found to be less than that of the batch materials, causing the increasing percent of $SiO_2$ and $Al_2O_3$ in glass compositions. Due to the large atomic mass and high melting point, the amount of $ZrO_2$ in the glass was found to be slightly less than that in the batch materials.
Crystal Phases It was further found that the types of the crystal phases from the XRD pattern mainly change with the amount of $Al_2O_3$ and $SiO_2$ when $Li_2O$ is kept in excess amount. When the molar percent of $Al_2O_3$:$Li_2O$:$SiO_2$ is from 5.4:22.5:68.3 to 7.4:20.5:68.3, the main crystal phases are petalite and $LiAlSi_3O_8$, with $Li_2SiO_3$ as a minor phase (FIG. 2A).

Without wishing to be bound by any theory, based on the XRD pattern, $LiAlSi_3O_8$ is believed to be the solid solution of β-spodumene due to similar peak positions. When the amount of $Al_2O_3$ is more than 7.4 mol %, the XRD shows the only presence of the β-spodumene solid solution, as the petalite phase does not appear in the XRD pattern (FIG. 2B). Again, without wishing to be bound by any theory, it was hypothesized that $LiAlSi_3O_8$ is more preferable to crystalize than petalite ($LiAlSi_4O_{10}$), as the ratio of $LiAlO_2$:$SiO_2$ is higher in $LiAlSi_3O_8$.

It was also found that when $Al_2O_3$ is lower than 5.4 mol %, the crystal peak at $2\theta \approx 38.4°$ becomes intensive (FIG. 2B). This peak is several times higher than others when the amount of $Al_2O_3$ is decreases to 3.4 mol %. Again, without wishing to be bound by any theory, this intensive peak (the plane (002) of $Li_2SiO_3$) is believed to be due to the anisotropic growth of lithium metasilicate crystals in glass-ceramics. When the amount of $SiO_2$ is too high compared with $Al_2O_3$, the crystal of $SiO_2$ can be present in the XRD pattern (FIG. 2B). Further, without wishing to be bound by any theory, it was found that the nucleation and crystal growth temperatures do not influence the types of crystal phases but influence the ratios of different crystals. The peak of the β-spodumene solid solution was found to be more intensive, while the lithium metasilicate peak has disappeared at high temperatures.

As the crystal growth rate of transparent glass-ceramics is far less than the maximum growth rate, the crystalline to amorphous ratio continuously increases with increasing crystal growth temperature. This ratio can also be influenced by the amount of $P_2O_5$, $B_2O_3$, and $ZrO_2$. Again, without wishing to be bound by any theory, it is assumed that large Zr atoms increase the activation barrier, and thus, leading to the decrease of the frequency of successful jumps of atoms from liquid to crystals. As a result, the crystalline to amorphous ratio largely decreases with more amount of $ZrO_2$. $P_2O_5$, as the nucleation agent, can decrease the nucleation temperature and increase the nucleation rate, and thus, resulting in an increase of crystalline to amorphous ratio. $B_2O_3$ has less influence on the ratio than $ZrO_2$ and $P_2O_5$. But high amount of $B_2O_3$ can lead to a decrease in the viscosity at crystal growth temperature, which slightly decreasing the activation barrier for the movement of atoms from liquid to crystals, and thus, causing the increase of crystalline to amorphous ratio.

Example 3

DSC Pattern and Viscosity

Figure 3A:
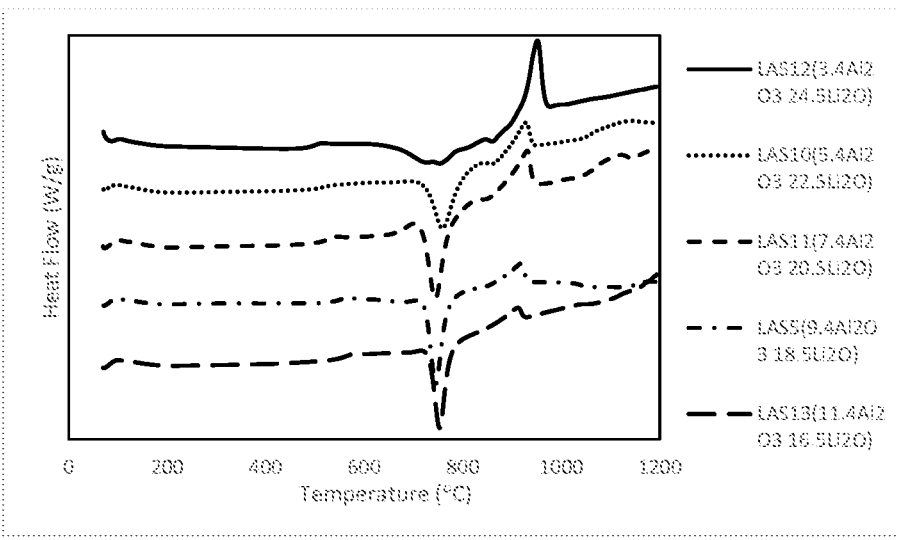
FIGS. 3A-3B depict DSC patterns.
Figure 3B:
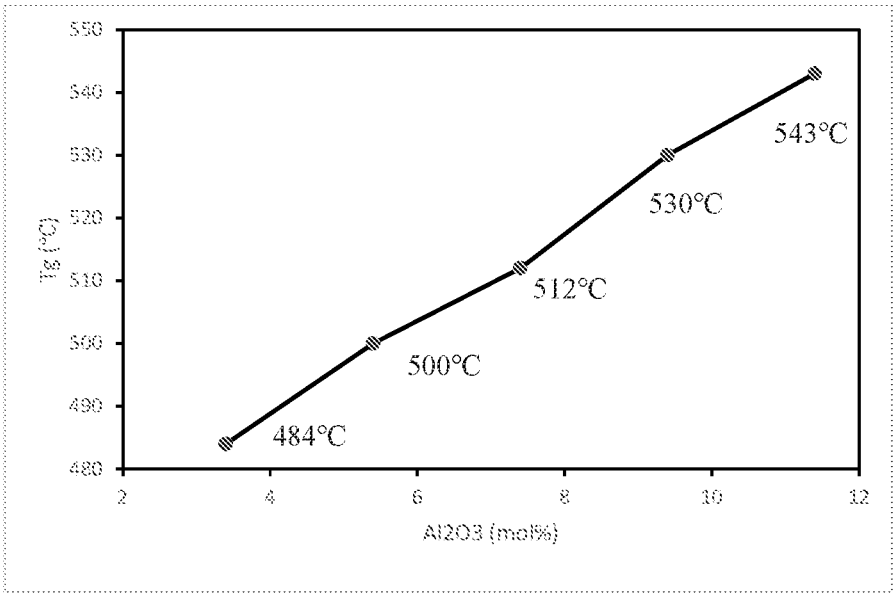

Variations in glass transition temperature, melting point ($T_m$), and crystallization temperature were investigated as a function of $Li_2O$ and $Al_2O_3$ amounts (FIG. 3A-B). It was found that $T_g$ linearly increases with an increasing amount of $Al_2O_3$ and a decreasing amount of $Li_2O$ (FIG. 3B). It was found that $T_g$ is 484° C. for sample 12 with 3.4 mol % $Al_2O_3$ and 24.5 mol % $Li_2O$, increasing around 60° C. for sample 13 with 11.4 mol % $Al_2O_3$ and 16.5 mol % $Li_2O$. It was further found that $T_m$ decreases with an increasing amount of $Al_2O_3$ and a decreasing amount of $Li_2O$.

Figure 4:
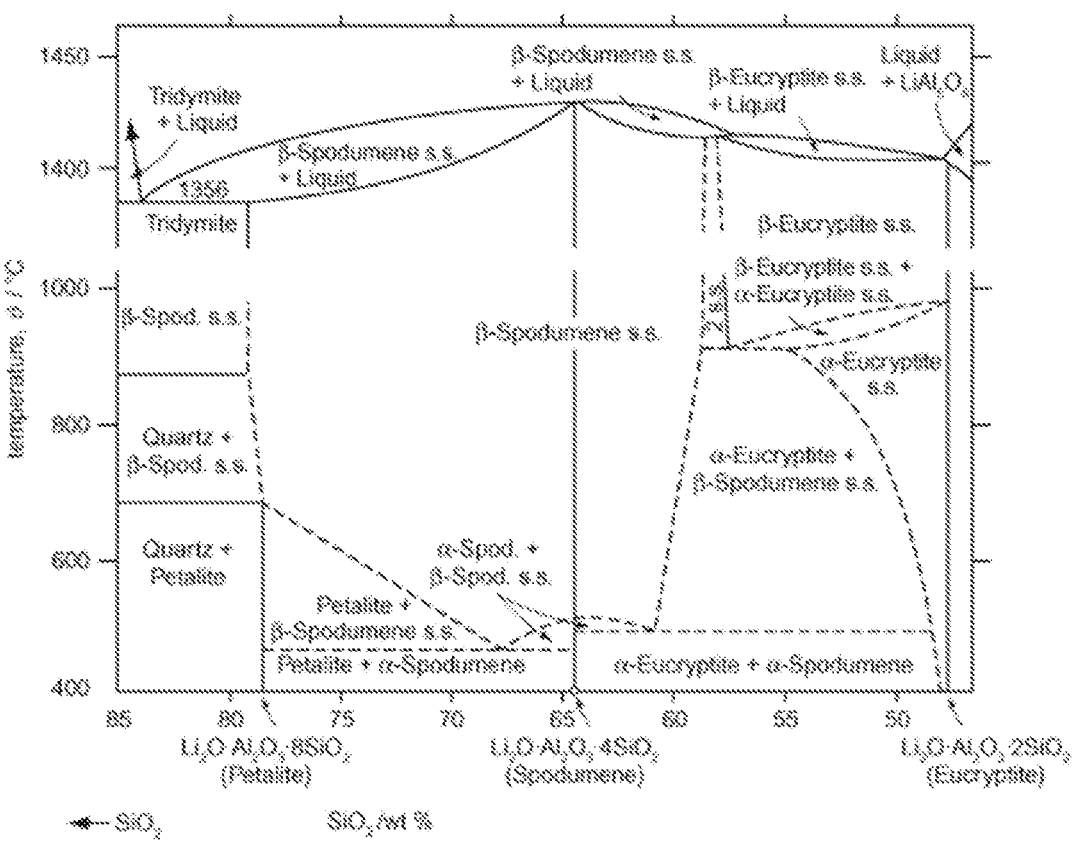
FIG. 4 shows the phase diagram of $LiAlO_2$—$SiO_2$, indicating the ranges of petalite and β-spodumene phases (according to reference [25]).

Without wishing to be bound by any theory, the crystallization peak around 750° C. is believed to be the peak of β-spodumene solid solution, according to the phase diagram of $LiAlO_2$—$SiO_2$ (FIG. 4). The depth of this peak decreases with a decreasing amount of $Al_2O_3$, indicating that the β-spodumene solid solution is less preferable in the low concentration of $Al_2O_3$. It was further found that in sample LAS12 with 3.4 mol % $Al_2O_3$, the negative peak at 723° C. appears, which can possibly correspond to the melting point of $Li_2SiO_3$. Analysis of this sample also has shown the appearance of another crystallization peak around 860° C. Which wishing to be bound by any theory, this peak was attributed to β-spodumene based on the phase diagram. No peaks of petalite were observed in the DSC pattern. Again, without wishing to be bound by any theory, it was hypothesized that such phenomena are due to the possible slow growth of petalite, compared with the 10° C./min heating rate in DSC. Again, without wishing to be bound by any theory, it was further hypothesized that this slow growth is responsible for the glass-ceramics samples staying transparent while being in the furnace for hours.

Figure 5A:
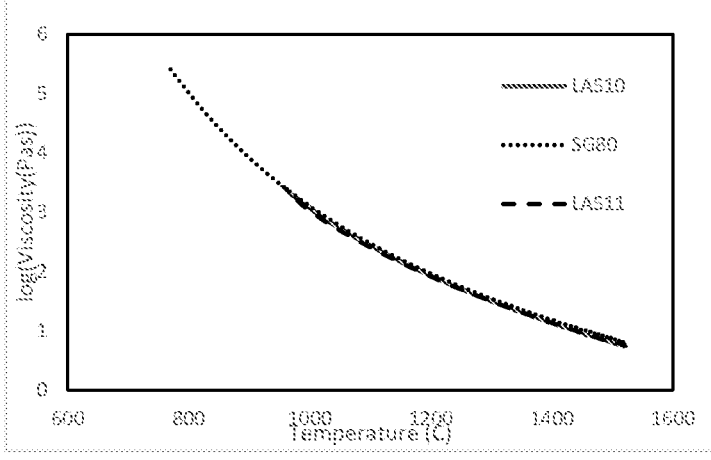
FIG. 5A depicts a viscosity-temperature curve of LAS10, LAS11, and a standard soda-lime silicate glass (SG80)
Figure 5B:
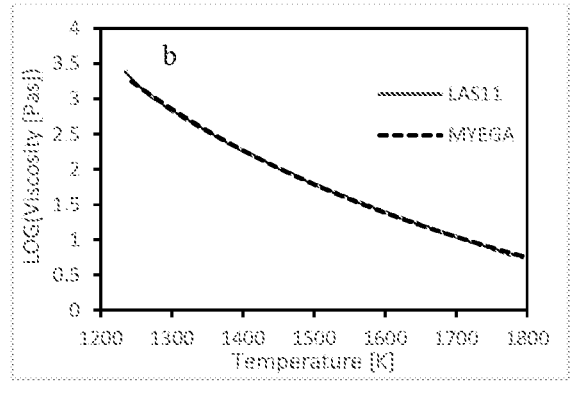
FIG. 5B depicts a MYEGA fitting of LAS11 sample.

The viscosity-temperature curves of LAS10 and LAS11, as shown in FIGS. 5A-B were also compared with standard soda lime silicate glass (SG 80(a)). It was found that both LAS10 and LAS11 crystallize around 950° C. at a 20 K/min cooling rate. The viscosity of lithium aluminosilicate glass was found to be less than SG80 at high temperatures. The data of LAS11 was then fitted with the Mauro-Yue-Ellison-Gupta-Allan (MYEGA) equation, using −2.93 for $\log_{10}\eta_\infty$. $T_g$ fitted in the MYEGA equation is 451° C., which is 61° C. lower than $T_g$ from DSC. Without wishing to be bound by any theory, it was assumed that this error can be due to the limited range of viscosity data at high temperatures. Fragility (m), the parameter useful in understanding liquid dynamics and glass transition behavior, can also be predicted from the MYEGA equation. It was found that the fragility of LAS11 is 27.

Example 4

Density of Glass Samples and Glass-Ceramics Samples

Figure 6:
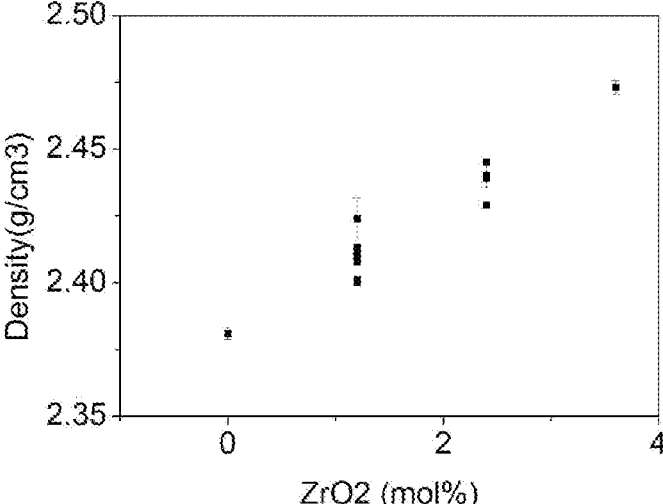
FIG. 6 depicts a density of exemplary glass samples with the amount of $ZrO_2$.

The densities of the glass samples were measured and were found to be in the range from 2.38 to 2.47 $g/cm^3$, mainly influenced by the amount of $ZrO_2$. FIG. 6 shows that the densities of glass increase with the amount of $ZrO_2$. Multiple linear regression equation was used to predict the influence of different oxides to the densities of glass (Equation 4):

$$\rho(g/cm^3)=2.37745+0.00027[Al_2O_3]+0.00003[Li_2O]+0.00078[B_2O_3]+0.00000[Na_2O]+0.02481[ZrO_2]+0.00000[P_2O_5] \quad (4)$$

where ρ is the density, 2.37745 $g/cm^3$ is the predicted density of pure silicate glass from a multiple linear regression equation with a percent error of 8.1% compared with experimental data (2.20 $g/cm^3$). Again, without wishing to be bound by any theory, this percent error was assumed to be mainly due to the simplified linear model. $R^2$ of the fitting model was found to be 0.92, indicating that 92 percent of the variabilities can be explained by the linear regression of different oxides. From the fitted data, the density of the glass samples is mainly increased with the amount of $ZrO_2$.

It was shown that the densities of the glass-ceramics sample are slightly higher than their mother glass. Without wishing to be bound by any theory, it was assumed that this is due to the crystals in glass-ceramics having ordered structure and less open space. However, it was also found that the densities of glass-ceramics are less than about 2% higher than the density of their mother glass.

Example 5

Transmittances

Figure 7:
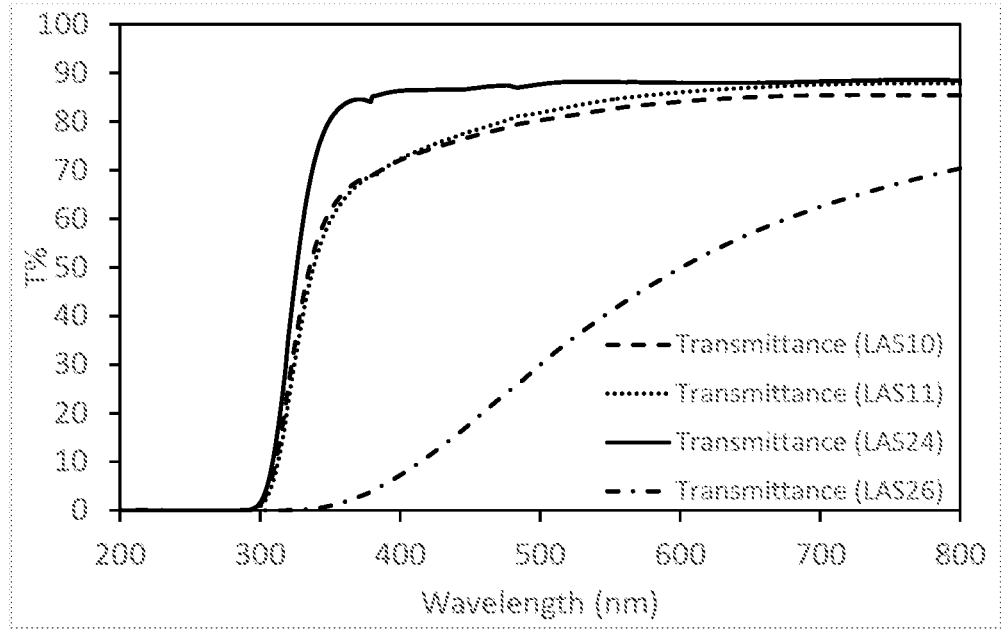
FIG. 7 depicts the transmittance of different exemplary glass-ceramics samples.

FIG. 7 shows the transmittance of different glass-ceramics samples prepared herein. The first number in the glass-ceramics, as shown in FIG. 7, refers to the nucleation temperature and nucleation time, and the second one refers to the crystal growth temperature and crystal growth time. It was found that most of the samples, except for sample LAS 26, exhibited the average transmittances in the visible light region (390-700 nm) higher than about 80% (Table 2).

TABLE 2

| The transmittance of exemplary glass-ceramics samples. | | | | |
|---|---|---|---|---|
| T, % | LAS10 | LAS11 | LAS24 | LAS26 |
| Ave. Trans. at 390 nm-700 nm | 81.3 | 83.0 | 87.7 | 38.4 |
| Trans. at 550 nm | 82.6 | 84.5 | 88.2 | 40.9 |
| Trans. at 400 nm | 72.1 | 72.3 | 86.3 | 72.5 |

It was further found that most of the investigated samples were transparent at low crystal growth temperature and tended to become translucent and opaque at a higher crystal growth temperature. Further, it was found that the samples containing a high amount of lithium metasilicate tended to be translucent or opaque at the low crystal growth temperature. Without wishing to be bound by any theory, it was assumed that transparency of the glass-ceramic compositions correlates with the anisotropic growth of lithium metasilicate, corresponding to the intensive peak in the XRD pattern.

Further, samples containing a high amount of β-spodumene solid solution were found to be transparent at the high crystal growth temperature. It was found, as shown in the DSC pattern, while β-spodumene crystallizes at a higher temperature, compared to petalite and lithium metasilicate crystallization, the β-spodumene crystals are smaller than petalite and lithium metasilicate crystals at the same crystal growth temperature.

Example 6

Microstructure

Figure 8A:
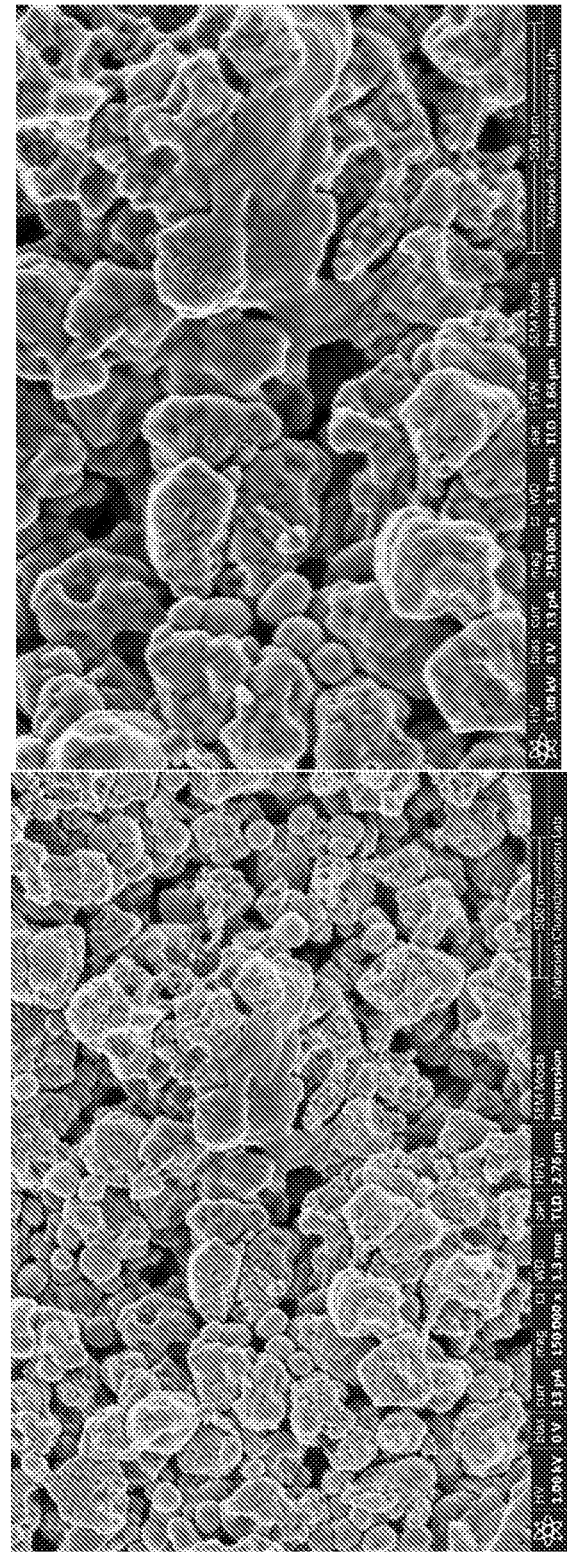
FIGS. 8A-8C depict secondary electron micrographs images of opaque (FIG. 8A), translucent (FIG. 8B), and transparent (FIG. 8C) exemplary LAS glass-ceramics from SEM.
Figure 8B:
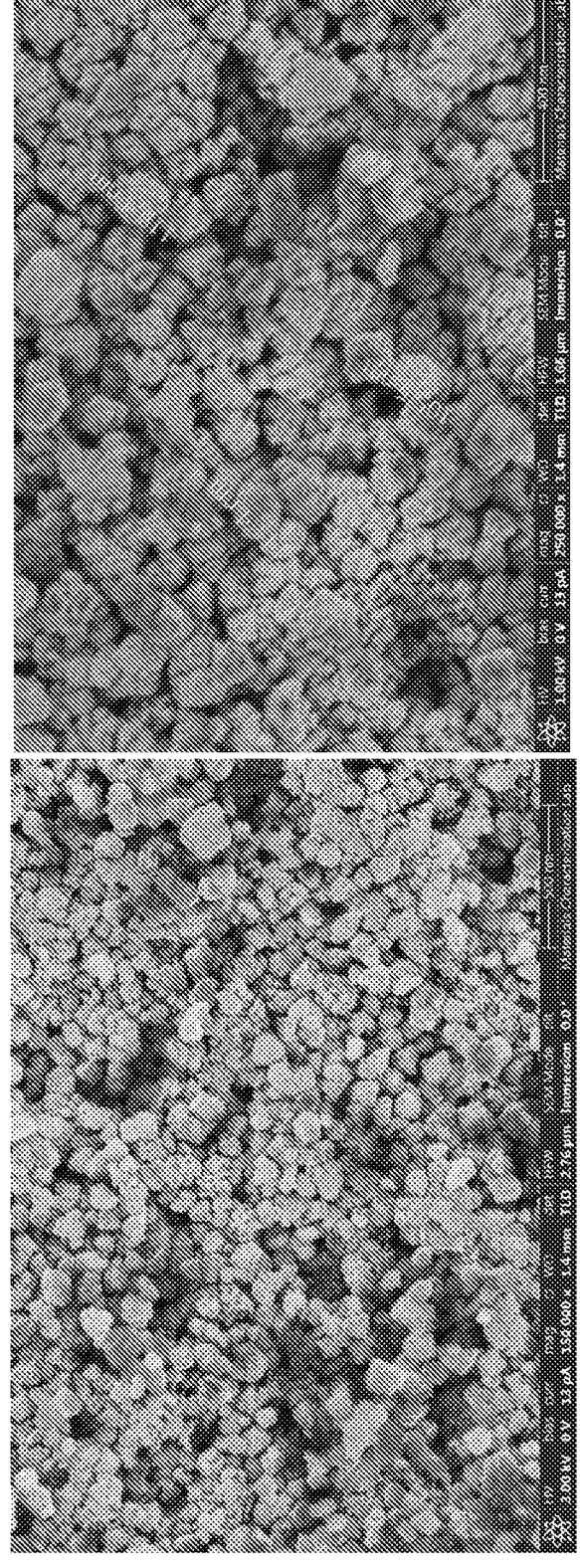
Figure 8C:
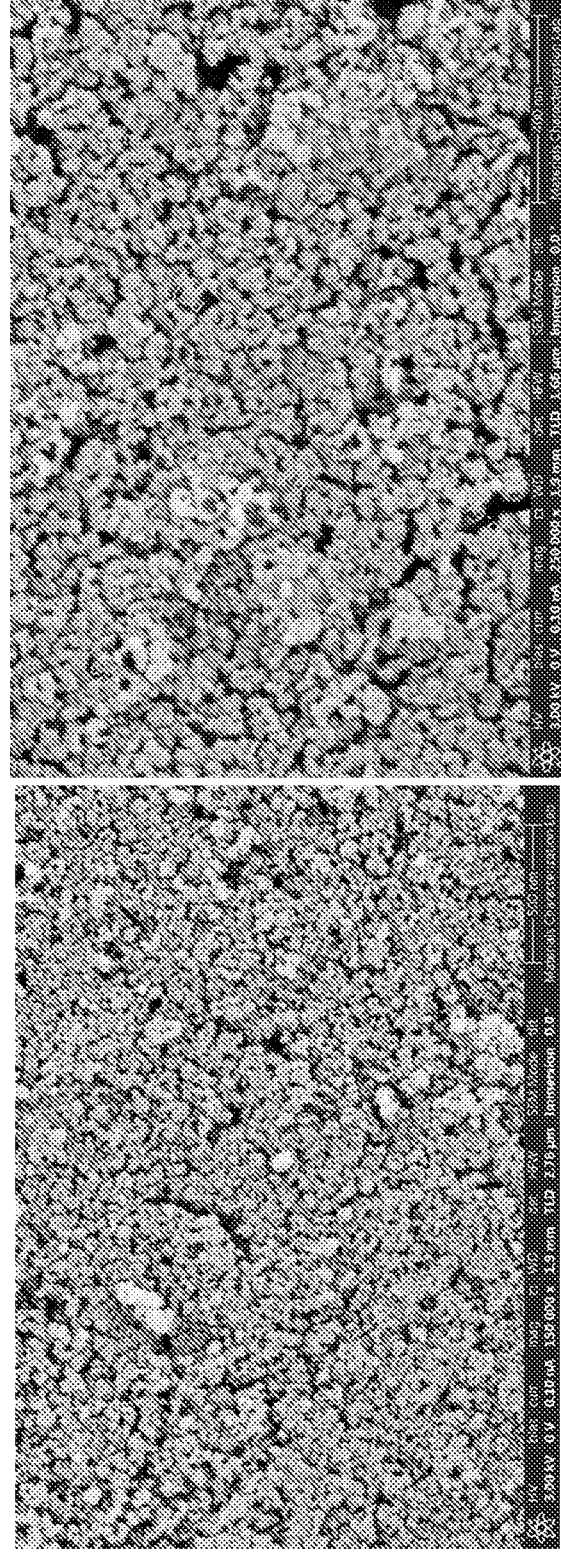

FIGS. 8A-8C show the secondary electron images of the microstructure of opaque, translucent, and transparent LAS glass-ceramics from SEM. Due to the different chemical durability of crystals and glass to hydrofluoric acid, crystals are observed under the electron microscope. It shows that the crystal sizes increase with crystal growth temperature and exposure time. The crystal sizes of transparent glass ceramics are between 20 and 40 nm, which were measured directly under SEM. Some small pits were observed on the surface of crystals due to the etching of hydrofluoric acid through the dislocations of crystals.

Example 7

Vickers Hardness and Crack Resistance

Indentation hardness and toughness of the exemplary samples disclosed herein are shown in Table 3. PPG, a standard soda lime silicate glass with 74 mol % $SiO_2$, 13.3 mol % $Na_2O$, 8.3 mol % CaO, 0.06 mol % $Al_2O_3$ and 3.7 mol % MgO [43], were measured under the same condition. Indentation hardness of glass-ceramics samples, increasing with higher crystal growth temperature, was far higher than that of PPG. The indentation toughness of glass-ceramics samples was higher than that of soda-lime silicate glass (0.75 MPa·m$^{1/2}$) and Pyrex (0.70 MPa·m$^{1/2}$). Samples with a higher amount of Al$_2$O$_3$ were found to have higher indentation hardness and toughness.

Figure 9A:
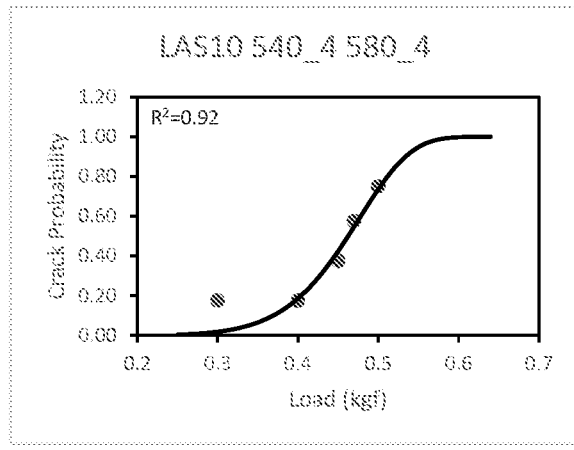
FIGS. 9A-9B depicts crack probabilities of different exemplary glass-ceramic samples under different loads.
Figure 9B:
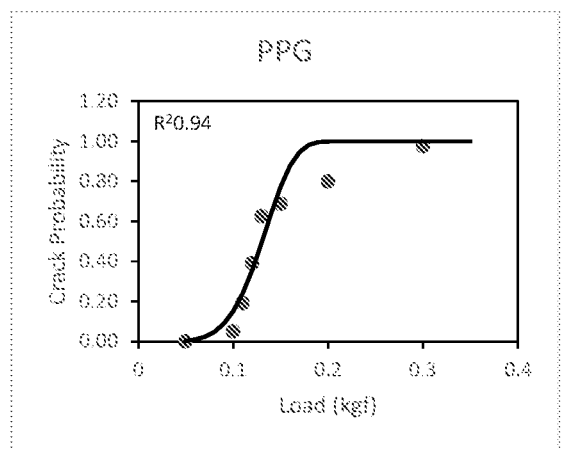

FIGS. 9A-B show the crack probabilities of glass-ceramics samples with different loads of indenters, compared with that of PPG. $R^2$ of the Weibull distribution on different samples was greater than 0.87. The average crack resistance of the samples was found to be 0.56 kgf, or four times higher In view of the described processes and compositions, hereinbelow are described certain more particularly described aspects of the inventions. These particularly recited aspects should not, however, be interpreted to have any limiting effect on any different claims containing different or more general teachings described herein, or that the "particular" aspects are somehow limited in some way other than the inherent meanings of the language and formulas literally used therein.

TABLE 3

| | Indentation hardness and toughness of LAS glass-ceramics | | | |
|---|---|---|---|---|
| Sample | LAS10 Glass | LAS10 580_4 590_4 | LAS10 580_4 610_4 | LAS10 580_4 630_4 |
| Indentation Hardness | 5.92 ± 0.34 GPa | 7.20 ± 0.15 GPa | 7.19 ± 0.16 GPa | 7.64 ± 0.34 GPa |
| Indentation Toughness | 0.95 ± 0.02 MPa · m$^{1/2}$ | 0.97 ± 0.04 MPa · m$^{1/2}$ | 0.91 ± 0.04 MPa · m$^{1/2}$ | 0.89 ± 0.05 MPa · m$^{1/2}$ |
| Sample | LAS10 580_4 730_4 | LAS10 580_4 750_4 | LAS10 580_4 770_4 | LAS10 580_4 790_4 |
| Indentation Hardness | 7.77 ± 0.26 GPa | 7.72 ± 0.20 GPa | 7.70 ± 0.18 GPa | 7.90 ± 0.25 GPa |
| Indentation Toughness | 1.05 ± 0.04 MPa · m$^{1/2}$ | 1.19 ± 0.09 MPa · m$^{1/2}$ | 1.20 ± 0.03 MPa · m$^{1/2}$ | 1.28 ± 0.07 MPa · m$^{1/2}$ |
| Sample | LAS11 Glass | LAS11 580_4 590_4 | LAS11 580_4 610_4 | LAS11 580_4 630_4 |
| Indentation Hardness | 6.03 ± 0.17 GPa | 6.30 ± 0.08 GPa | 7.96 ± 0.13 GPa | 7.80 ± 0.50 GPa |
| Indentation Toughness | 0.98 ± 0.02 MPa · m$^{1/2}$ | 1.13 ± 0.05 MPa · m$^{1/2}$ | 0.88 ± 0.02 MPa · m$^{1/2}$ | 0.91 ± 0.13 MPa · m$^{1/2}$ |
| Sample | LAS11 580_4 730_4 | LAS11 580_4 750_4 | LAS11 580_4 770_4 | Soda-lime silicate glass(PPG) |
| Indentation Hardness | 7.81 ± 0.28 GPa | 7.79 ± 0.19 GPa | 7.81 ± 0.28 GPa | 5.35 ± 0.07 GPa |
| Indentation Toughness | 1.08 ± 0.02 MPa · m$^{1/2}$ | 1.36 ± 0.06 MPa · m$^{1/2}$ | 1.23 ± 0.04 MPa · m$^{1/2}$ | 0.75 ± 0.01 MPa · m$^{1/2}$ | than that of PPG. Without wishing to be bound by any theory, it was assumed that this high crack resistance is the result of the ceramming process. The interlocking microstructure created from crystal grains in glass-ceramics can promote crack bridging and deflection and thus, lead to an increase in crack resistance.

Example 8

Thermal Expansion Coefficients

Figure 10:
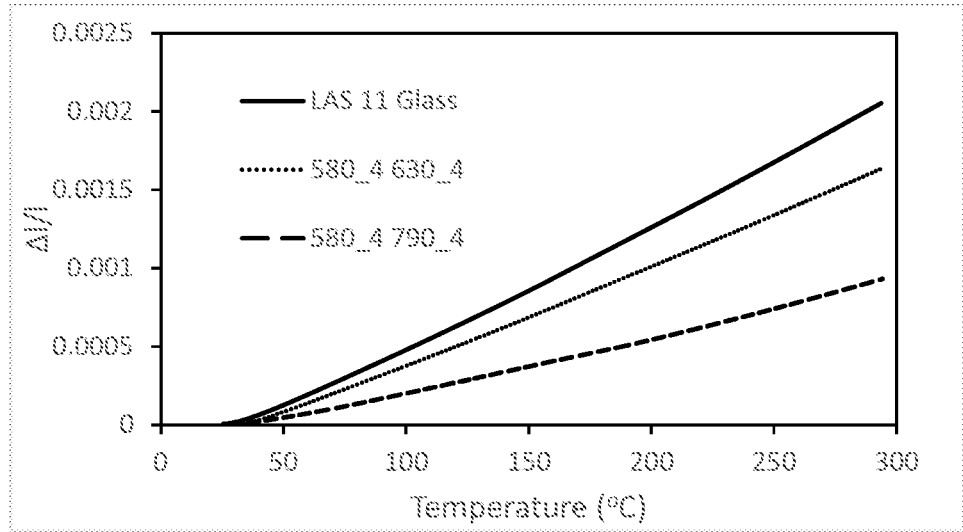
FIG. 10 depicts a CTE of exemplary LAS11 glass and glass-ceramics samples.

FIG. 10 shows the linear thermal expansion coefficients (CTE) obtained from TMA in the range from 25° C. to 300° C. for both LAS10 and LAS11 glass and glass-ceramics. The thermal expansion coefficients of glass-ceramics were found to be in the range of 40-90×10$^{-7}$/° C., significantly higher than that of SiO$_2$ glass (5.5×10$^{-7}$/° C.). CTE of glass-ceramics was found to be lower than the corresponding glass, indicating that CTE of petalite and β-spodumene crystals are lower than the glass matrix. CTE was higher in samples with a higher amount of Li$_2$O.

The claims are not intended to include, and should not be interpreted to include, means-plus- or step-plus-function limitations, unless such a limitation is explicitly recited in a given claim using the phrase(s) "means for" or "step for," respectively.

ASPECTS

Aspect 1: A glass-ceramic composition comprising: from about 2 mol % to about 20 mol % of Al$_2$O$_3$; from about 2 mol % to about 45 mol % of Li$_2$O; and from about 48 mol % to about 80 mol % of SiO$_2$; having a β-spodumene phase and a lithium silicate crystalline phase, and optionally a petalite phase.

Aspect 2: The glass-ceramic composition of Aspect 1, wherein Al$_2$O$_3$ is present from about 5 mol % to about 7.5 mol %, the glass-ceramic composition comprises a major crystalline phase comprising from about 20 to about 80% of the β-spodumene phase and from about 20 to about 80% of the petalite phase and a minor crystalline phase comprising up to about 10% of the lithium silicate phase.

Aspect 3: The glass-ceramic composition of Aspect 2, wherein Li$_2$O is present from about 20 mol % to about 25 mol %.

Aspect 4: The glass-ceramic composition of Aspect 1, wherein Al$_2$O$_3$ is present from about 7 mol % to about 12 mol %, the glass-ceramic composition comprises a major crystalline phase comprising from about 60% to about 90% of the β-spodumene phase and a minor crystalline phase comprising up to about 10% of the lithium silicate phase.

Aspect 5: The glass-ceramic composition of any one of Aspects of 1-4, wherein the lithium silicate crystalline phase comprises a lithium metasilicate crystalline phase.

Aspect 6: The glass-ceramic composition of any one of Aspects 1-5, further comprising from 0 mol % to about 8 mol % of $B_2O_3$, from 0 mol % to about 8 mol % of $ZrO_2$, from 0 mol % to about 5 mol % of $P_2O_5$, and from 0 mol % to about 5 mol % of $Na_2O$.

Aspect 7: The glass-ceramic composition of any one of Aspects 1-6, wherein the composition exhibits density from about 2.00 g/cm³ to about 2.6 g/cm³.

Aspect 8: The glass-ceramic composition of any one of Aspects 1-7, exhibiting an average transmittance greater than about 80% over a wavelength range from about 390 nm to about 700 nm as measured for a sample prepared from the composition and having a thickness of about 2.00 mm.

Aspect 9: The glass-ceramic composition of any one of Aspects 1-7, exhibiting an average transmittance between 20% and 80% over a wavelength range from about 390 nm to about 700 nm as measured for a sample prepared from the composition and having a thickness of about 2.00 mm.

Aspect 10: The glass-ceramic composition of any one of Aspects 1-7, exhibiting an average transmittance lower than 20% over a wavelength range from about 390 nm to about 700 nm as measured for a sample prepared from the composition and having a thickness of about 2.00 mm.

Aspect 11: The glass-ceramic composition of Aspect 8, comprising a plurality of crystal grains, wherein the median size of a crystal grain is from about 20 to about 80 nm.

Aspect 12: The glass-ceramic composition of Aspect 9, comprising a plurality of crystal grains, wherein the median size of a crystal grain is from greater than about 80 nm to about 500 nm.

Aspect 13: The glass-ceramic composition of Aspect 10, comprising a plurality of crystal grains, wherein the median size of a crystal grain is from greater than about 500 nm.

Aspect 14: The glass-ceramic composition of any one of Aspects 1-13, exhibiting Vickers hardness equal to or greater than about 6.0 GPa.

Aspect 15: The glass-ceramic composition of any one of Aspects 1-14, exhibiting Vickers hardness of at least about 5% greater than Vickers hardness of a standard soda lime silicate glass.

Aspect 16: The glass-ceramic composition of any one of Aspects 1-15, exhibiting a crack-resistance greater than about 0.2 kgf.

Aspect 17: The glass-ceramic composition of any one of Aspects 1-16, exhibiting a crack-resistance greater than about 0.4 kgf.

Aspect 18: The glass-ceramic composition of any one of Aspects 1-17, exhibiting a crack-resistance that at least 4 times higher than a crack-resistance of a standard soda lime silicate glass.

Aspect 19: The glass-ceramic composition of any one of Aspects 1-18 exhibiting a thermal expansion coefficient from about $40\times10^{-7}$ to about $90\times10^{-7}$/° C.

Aspect 20: The glass-ceramic composition of any one of Aspects 1-19, wherein the composition exhibits a glass transition temperature ($T_g$) from about 450° C. to about 600° C.

Aspect 21: The glass-ceramic composition of any one of Aspects 1-20, wherein the composition further comprises one or more of fining agents selected from $CeO_2$, $SnO_2$, $Fe_2O_3$, $As_2O_3$, $Sb_2O_3$, $MnO_2$, or a combination thereof, and wherein the one or more fining agents are present in a total amount equal to or less than about 1 mol %.

Aspect 22: The glass-ceramic composition of any one of Aspects 1-21, further comprising one or more of coloring components selected from transition metal oxides and/or rare earth metal oxide, and wherein the one or more coloring components are present in a total amount equal to or less than about 1 mol %.

Aspect 23: The glass-ceramic composition of any one of Aspects 1-22, further comprising a decolorizing agent comprising sodium sulphate, selenium compounds, erbium oxide, cerium oxide, cobalt oxide, manganese oxide, or any combination thereof.

Aspect 24: The glass-ceramic composition of any one of Aspects 1-23, wherein the composition is ion-exchangeable.

Aspect 25: A glass-ceramic composition comprising: $Al_2O_3$ present from about 2 mol % to about 20 mol %, $SiO_2$ present from about 48 mol % to about 80 mol %; $R'_2O$ present from greater than 0 mol % to about 45 mol %; and wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase.

Aspect 26: The glass-ceramic composition of Aspect 25, wherein when $R'_2O$ comprises $Li_2O$, the composition comprises a minor crystalline phase comprising a lithium silicate phase.

Aspect 27: The glass-ceramic composition of Aspect 25 or 26, wherein $Al_2O_3$ is present from about 5 mol % to about 7.5 mol %, the glass-ceramic composition comprises a major crystalline phase comprising from about 20 to about 80% of the β-spodumene phase and from about 20 to about 80% of the petalite phase.

Aspect 28: The glass-ceramic composition of Aspect 26, wherein $Al_2O_3$ is present from about 5 mol % to about 7.5 mol % and $Li_2O$ is present from 20 mol % to about 25 mol %, the glass-ceramic composition comprises a major crystalline phase comprising from about 20 to about 80% of the β-spodumene phase and from about 20 to about 80% of the petalite phase, and a minor phase comprises up to 10 mol % of the lithium silicate phase.

Aspect 29: The glass-ceramic composition of Aspect 25 or 26, wherein $Al_2O_3$ is present from about 7 mol % to about 12 mol %, the glass-ceramic composition comprises a major crystalline phase comprising from about 60% to about 90% of the β-spodumene phase.

Aspect 30: The glass-ceramic composition of Aspect 26, wherein $Al_2O_3$ is present from about 7 mol % to about 12 mol %, the glass-ceramic composition comprises a major crystalline phase comprising from about 60% to about 90% of the β-spodumene phase and a minor crystalline phase comprising up to about 10% of the lithium silicate phase.

Aspect 31: The glass-ceramic composition of any one of Aspects 25-30, wherein the composition further comprises: $B_2O_3$ present from 0 mol % to about 8 mol %, $ZrO_2$ from 0 mol % to about 8 mol %, and $P_2O_5$ from 0 mol % to about 5 mol %, Aspect 32: The glass-ceramic composition of any one of Aspects 25-31, wherein the composition is transparent, translucent, or opaque.

Aspect 33: The glass-ceramic composition of any one of Aspects 25-32, comprising a compressive stress layer.

Aspect 34: The glass-ceramic composition of any one of Aspects 25-33, wherein the composition exhibits density from about 2.00 $g/cm^3$ to about 2.6 $g/cm^3$.

Aspect 35: The glass-ceramic composition of any one of Aspects 32-34, wherein the composition is transparent and comprises a plurality of crystal grains, wherein the median size of a crystal grain is from about 20 to about 80 nm.

Aspect 36: The glass-ceramic composition of any one of Aspects 32-34, wherein the composition is translucent and comprises a plurality of crystal grains, wherein the median size of a crystal grain is from greater than about 80 nm to about 500 nm.

Aspect 37: The glass-ceramic composition of any one of Aspects 32-34, wherein the composition is opaque and comprises a plurality of crystal grains, wherein the median size of a crystal grain is from greater than about 500 nm.

Aspect 38: The glass-ceramic composition of any one of Aspects 25-37, exhibiting Vickers hardness equal to or greater than about 6.0 GPa.

Aspect 39: The glass-ceramic composition of any one of Aspects 25-38, exhibiting Vickers hardness of at least about 5% greater than Vickers hardness of a standard soda lime silicate glass.

Aspect 40: The glass-ceramic composition of any one of Aspects 25-39, exhibiting a crack-resistance greater than about 0.2 kgf.

Aspect 41: The glass-ceramic composition of any one of Aspects 25-40, exhibiting a crack-resistance greater than about 0.4 kgf.

Aspect 42: The glass-ceramic composition of any one of Aspects 25-41, exhibiting a crack-resistance that at least 4 times higher than a crack-resistance of a standard soda lime silicate glass.

Aspect 43: The glass-ceramic composition of any one of Aspects 25-42, exhibiting a thermal expansion coefficient from about $40 \times 10^{-7}$ to about $90 \times 10^{-7}/°$ C.

Aspect 44: The glass-ceramic composition of any one of Aspects 25-43, wherein the composition exhibits a glass transition temperature ($T_g$) from about 450° C. to about 600° C.

Aspect 45: The glass-ceramic composition of any one of Aspects 25-44, wherein the composition further comprises one or more fining agents selected from $CeO_2$, $SnO_2$, $Fe_2O_3$, $As_2O_3$, $Sb_2O_3$, $MnO_2$, or a combination thereof, and wherein the one or more fining agents are present in a total amount equal to or less than about 1 mol %.

Aspect 46: The glass-ceramic composition of any one of Aspects 25-45, wherein the composition further comprises a decolorizing agent comprising sodium sulphate, selenium compounds, erbium oxide, cerium oxide, cobalt oxide, manganese oxide, or any combination thereof.

Aspect 47: The glass-ceramic composition of any one of Aspects 25-46, further comprising one or more coloring components selected from transition metal oxides and/or rare earth metal oxide, and wherein the one or more coloring components are present in a total amount equal to or less than about 1 mol %.

Aspect 48: The glass-ceramic composition of any one of Aspects 25-47, wherein $Ag_2O$, and/or $Cu_2O$, and/or CuO is present and wherein the glass-ceramic composition exhibits antimicrobial, antiviral, antibacterial, and/or antifungal properties.

Aspect 49: A glass-ceramic article comprising the composition of any one of Aspects 1-48.

Aspect 50: A glass-ceramic article comprising the composition of any one of Aspects 33-48, wherein the compressive stress layer extends from a surface of the article to a depth of the compressive stress layer, and wherein the depth is from about 1 μm to about 100 μm.

Aspect 51: A glass-ceramic article comprising the composition of any one of Aspects 33-48, wherein the compressive stress layer extends from a surface of the article to a depth of the compressive stress layer, and wherein the depth is up to about 25% of a thickness of the glass-ceramic article.

Aspect 52: A glass-ceramic article comprising: from about 2 mol % to about 20 mol % of $Al_2O_3$; from about 2 mol % to about 45 mol % of $Li_2O$; and from about 48 mol % to about 80 mol % of $SiO_2$; having a β-spodumene phase and a lithium silicate crystalline phase, and optionally a petalite phase.

Aspect 53: A glass-ceramic article comprising: $Al_2O_3$ present from about 2 mol % to about 20 mol %; $SiO_2$ present from about 48 mol % to about 80 mol %; and $R'_2O$ present from greater than 0 mol % to about 45 mol %; wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase.

Aspect 54: The article of any one of Aspects 49-53, wherein the article comprises a hollowware, tableware, container, plate, sheet, float/flat sheet, cookware, powder, fiber, cones, spheres, blades, or any combination thereof.

Aspect 55: The article of any one of Aspects 49-54, wherein the article is formed by a float/flat glass press process, a press-and-blow process, a blow-and-blow process, or any combination thereof.

Aspect 56: A tableware comprising the composition of any one of Aspects 1-48.

Aspect 57: The tableware of Aspect 56, wherein the tableware is formed by a glass press process, a press-and-blow process, and/or a blow-and-blow process.

Aspect 58: A hollowware comprising the composition of any one of Aspects 1-48.

Aspect 59: The hollowware of Aspect 57, wherein the hollowware is formed by a glass press process, a press-and-blow process, and/or a blow-and-blow process.

Aspect 60: A powder comprising the composition of any one of Aspects 1-48.

Aspect 61: A cookware comprising the composition of any one of Aspects 1-48.

Aspect 62: The cookware of Aspect 61, wherein the cookware is formed by a glass press process, a press-and-blow process, and/or a blow-and-blow process.

Aspect 63: A fiber comprising the composition of any one of Aspects 1-48.

Aspect 64: The fiber of Aspect 63, wherein the fiber is formed by a continuous or discontinuous fiber drawing or spinning process.

Aspect 65: A float or flat glass press product comprising the composition of any one of Aspects 1-48.

Aspect 66: A press-and-blow process product comprising the composition of any one of Aspects 1-48.

Aspect 67: A blow-and-blow process product comprising the composition of any one of Aspects 1-48.

Aspect 68: A method comprising: forming a mixture comprising: a) from about 2 mol % to about 20 mol % of $Al_2O_3$; from about 2 mol % to about 45 mol % of $Li_2O$; and from about 48 mol % to about 80 mol % of $SiO_2$; b) forming a homogeneous composition; and c) ceramming the homogeneous composition to form a glass-ceramic composition.

Aspect 69: The method of Aspect 68, wherein the mixture further comprises from 0 mol % to about 8 mol % of $ZrO_2$, or from 0 mol % to about 5 mol % of $P_2O_5$, or a combination thereof.

Aspect 70: The method of Aspect 68 or 69, wherein the step of forming the homogenous composition comprises melting the mixture in a furnace at a temperature from about 1,300° C. to about 1,700° C. for a first predetermined time.

Aspect 71: The method of Aspect 70, further comprising a step of annealing at a temperature from about 450° C. to about 700° C.

Aspect 72: The method of any one of Aspects 68-71, wherein the step of ceramming comprises heating the homogenous composition at a nucleation temperature for a second predetermined time.

Aspect 73: The method of Aspect 72, wherein the nucleation temperature is from about 450° C. to about 650° C.

Aspect 74: The method of Aspect 71 or 72, wherein the step of ceramming further comprises a step of heating the composition to a crystallization temperature at a rate from about 5° C./min to about 15° C./min and keeping the composition at the crystallization temperature for a third predetermined time.

Aspect 75: The method of Aspect 74, wherein the crystallization temperature is from about 580° C. to about 800° C.

Aspect 76: The method of any one of Aspects 74-75, wherein the first, the second, and/or the third predetermined times are from about 3 to 5 hours.

Aspect 77: The method of any one of Aspects 72-76, wherein $P_2O_5$ is a nucleation agent.

Aspect 78: The method of any one of Aspects 74-77, wherein $ZrO_2$ is a crystal size growth-limiting agent.

Aspect 79: The method of any one of Aspects 68-78, wherein the glass-ceramic composition comprises a β-spodumene phase, optionally petalite phase, and a lithium silicate crystalline phase.

Aspect 80: The method of Aspect 79, wherein $Al_2O_3$ is present from about 5 mol % to about 7.5 mol %, the glass-ceramic composition comprises a major crystalline phase comprising from about 20 to about 80% of the β-spodumene phase and from about 20 to about 80% of the petalite phase and a minor crystalline phase comprising up to about 10% of the lithium silicate phase.

Aspect 81: The method of Aspect 80, wherein $Li_2O$ is present in the composition from about 20 mol % to about 25 mol %.

Aspect 82: The method of Aspect 81, wherein $Al_2O_3$ is present from about 7 mol % to about 12 mol %, the glass-ceramic composition comprises a major crystalline phase comprising from about 60% to about 90% of the β-spodumene phase and a minor crystalline phase comprising up to about 10% of the lithium silicate phase.

Aspect 83: The method of any one of Aspects 80-82, wherein the lithium silicate crystalline phase comprises a lithium metasilicate crystalline phase.

Aspect 84: The method of any one of Aspects 68-83, wherein the mixture further comprises from 0 mol % to about 8 mol % of $B_2O_3$, and from 0 mol % to about 8 mol % of $Na_2O$.

Aspect 85: The method of any one of Aspects 68-84, further comprising a step of ion exchange treatment comprising exposure to a salt bath, spray, paste, a vapor-assisted ion exchange, a plasma-assisted ion exchange, or any combination thereof.

Aspect 86: The method of Aspect 85, wherein the ion exchange treatment is electrically accelerated.

Aspect 87: The method of Aspect 85 or 86, wherein the step of ion-exchange treatment comprises placing the glass-ceramic composition into a molten salt bath comprising sodium, potassium, silver, or copper (I) ions, or a combination thereof at conditions effective to provide an ion-exchanged glass-ceramic composition.

Aspect 88: The method of Aspect 87, wherein the ion-exchanged glass-ceramic composition comprises: $Al_2O_3$ present from about 2 mol % to about 20 mol %; $SiO_2$ present from about 48 mol % to about 80 mol %; $R'_2O$ present from greater than 0 mol % to about 45 mol %; and wherein $R'_2O$ comprises $Li_2O$, $Na_2O$, $K_2O$, $Ag_2O$, $Cu_2O$, CuO, or a combination thereof, wherein the composition comprises a major crystalline phase comprising a β-spodumene phase, and optionally, a petalite phase.

Aspect 89: The method of Aspect 87 or 88, wherein the conditions effective to provide the ion-exchanged glass-ceramic composition comprise exposure of the glass-ceramic composition to a molten salt at a temperature from about 380° C. to about 500° C. for a time period from about 4 hours to about 20 hours.

Aspect 90: The method of any one of Aspects 87-89, wherein the ion-exchanged glass-ceramic composition comprises a compressive stress layer.

Aspect 91: The method of any one of Aspects 68-90, wherein the glass-ceramic composition and/or the ion-exchanged glass-ceramic composition exhibit density from about 2.00 g/cm³ to about 2.6 g/cm³.

Aspect 92: The method of any one of Aspects 68-91 wherein the glass-ceramic composition and/or the ion-exchanged glass-ceramic composition exhibit an average transmittance greater than about 80% over a wavelength range from about 390 nm to about 700 nm for a sample formed from the glass-ceramic and/or the ion-exchanged glass-ceramic composition and having a thickness of about 2.00 mm.

Aspect 93: The method of any one of Aspects 68-92, wherein the glass-ceramic composition and/or the ion-exchanged glass-ceramic composition exhibit an average transmittance between 20% and 80% over a wavelength range from about 390 nm to about 700 nm as measured for a sample formed from the glass-ceramic and/or the ion-exchanged glass-ceramic composition and having a thickness of about 2.00 mm.

Aspect 94: The method of any one of Aspects 68-93, wherein the glass-ceramic composition and/or the ion-exchanged glass-ceramic composition exhibit an average transmittance lower than 20% over a wavelength range from about 390 nm to about 700 nm as measured for a sample formed from the glass-ceramic and/or the ion-exchanged glass-ceramic composition and having a thickness of about 2.00 mm.

Aspect 95: The method of Aspect 94, wherein the glass-ceramic composition and/or the ion-exchanged glass-ceramic composition comprise a plurality of crystal grains, wherein a size of a crystal grain is from about 20 to about 80 nm.

Aspect 96: The method of Aspect 95, wherein the glass-ceramic composition and/or the ion-exchanged glass-ceramic composition comprises a plurality of crystal grains, wherein the median size of a crystal grain is from greater than about 80 nm to about 500 nm.

Aspect 97: The method of Aspect 96, wherein the glass-ceramic composition and/or the ion-exchanged glass-ceramic composition comprise a plurality of crystal grains, wherein the median size of a crystal grain is from greater than about 500 nm.

Aspect 98: The method of any one of Aspects 68-97, wherein the glass-ceramic composition and/or the ion-exchanged glass-ceramic composition exhibit Vickers hardness equal to or greater than about 6.0 GPa.

Aspect 99: The method of any one of Aspects 68-98, wherein the glass-ceramic composition and/or the ion-exchanged glass-ceramic composition exhibit Vickers hardness of at least about 5% greater than Vickers hardness of a composition comprising a standard soda lime silicate glass.

Aspect 100: The method of any one of Aspects 68-99, wherein the glass-ceramic composition and/or the ion-exchanged glass-ceramic composition exhibit a crack-resistance greater than about 0.2 kgf.

Aspect 101: The method of any one of Aspects 68-100, wherein the glass-ceramic composition and/or the ion-exchanged glass-ceramic composition exhibit a crack-resistance greater than 0.4 kgf.

Aspect 102: The method of any one of Aspects 68-101, wherein the glass-ceramic composition exhibits a crack-resistance that at least 4 times higher than a crack-resistance of a composition comprising a standard soda lime silicate glass.

Aspect 103: The method of any one of Aspects 68-102, wherein the glass-ceramic composition and/or the ion-exchanged glass-ceramic composition exhibit a thermal expansion coefficient from about $40 \times 10^{-7}$ to about $90 \times 10^{-7}/°$ C.

Aspect 104: The method of any one of Aspects 68-103, wherein the glass-ceramic composition and/or the ion-exchanged glass-ceramic composition exhibit a glass transition temperature $T_g$ from about 450° C. to about 600° C.

Aspect 105: The method of any one of Aspects 68-104 further comprising a step of forming a glass-ceramic article.

Aspect 106: The method of Aspect 105, wherein the step of forming the glass-ceramic articles comprises a float or flat press process, a press-and-blow process, a blow-and-blow process, or any combination thereof.

Aspect 107: The method of Aspect 105 or 106, wherein the glass-ceramic article comprises the ion-exchange composition and wherein the compressive stress layer extends from a surface of the article to a depth of the compressive stress layer, wherein the depth is from about 1 μm to about 100 μm.

Aspect 108: The method of any one of Aspects 105-107, wherein the glass-ceramic article comprises the ion-exchange composition and wherein the compressive stress layer extends from a surface of the article to a depth of the compressive stress layer, and wherein the depth is up to about 25% of a thickness of the glass-ceramic article.

Aspect 109: The method of any one of Aspects 105-108, wherein the article comprises a hollowware, tableware, container, plate, sheet, float/flat sheet, cookware, powder, fiber, cones, spheres, blades, or any combination thereof.

Aspect 110: A method of forming an article comprising forming a composition of any one of Aspects 1-48: and then forming the article, wherein the article comprises a hollowware, tableware, container, plate, sheet, float/flat sheet, cookware, powder, fiber, cones, spheres, blades, or any combination thereof.

Aspect 111: The method of Aspect 110, wherein the step of forming comprises a float/flat press process, a press-and-blow process, a blow-and-blow process, or any combination thereof.

Aspect 112: The method of Aspect 110 or 111, wherein the step of forming the composition comprises the method of any one of Aspects 68-104.

REFERENCES

[1] I. Denry, & J. Holloway, Ceramics for dental applications: a review, Mater., 3 (1) (2010) 351-368.

[2] B. Deng, J. Luo, J. T. Harris, C. M. Smith & M. E. Mckenzie, Molecular dynamics simulations on fracture toughness of Al2O3-SiO2 glass-ceramics, Scr. Mater. 162 (2019) 277-280.

[3] S. Wen, Y. Wang, B. Lan, W. Zhang, Z. Shi, S. Lv, Y. Zhao, J. Qiu & S. Zhou, Pressureless crystallization of glass for transparent nanoceramics, Adv. Sci. 6 (17) (2019) 1901096.

[4] W. Holand, & G. H. Beall, Glass-ceramic technology, John Wiley & Sons (2019).

[5] H. Bach ed., Low thermal expansion glass ceramics, Springer Science & Business Media (2013).

[6] M. Krishna Murthy, & F. A. Hummel, Phase equilibria in the system lithium metasilicate-β-eucryptite, J. Am. Ceram. Soc. 37 (1) (1954) 14-17.

[7] G. H. Beall, Q. Fu, & C. M. Smith, U.S. Pat. No. 9,809,488. Washington, D.C.: U.S. Patent and Trademark Office (2017).

[8] G. H. Beall, & L. R. Pinckney, Nanophase glass-ceramics, J. Am. Ceram. Soc. 82 (1) (1999) 5-16.

[9] C. T. Li, The crystal structure of LiAlSi2O6 III (high-quartz solid solution), Z. Kristallogr.-Cryst. Mater. 127 (1-6) (1968) 327-348.

[10] G. H. Beall, and D. A. Duke, Transparent glass-ceramics, J. Mater, Sci. 4 (4) (1969) 340-352.

[11] M. C. Gonçalves, L. F. Santos, & R. M. Almeida, Rare-earth-doped transparent glass ceramics, C. R. Chim. 5 (12) (2002) 845-854.

[12] G. H. Beall, Design and properties of glass-ceramics, Annu. Rev. Mater. Sci. 22 (1) (1992) 91-119.

[13] P. Hartmann, K. Nattermann, T. Döhring, R. Jedamzik, M. Kuhr, P. Thomas, G. Kling, & S. Lucarelli, ZERODUR® glass ceramics for high stress applications. In Optical Materials and Structures Technologies IV (Vol. 7425, p. 74250M). Int. Soc. Opt. Photonics (2009).

[14] E. D. Zanotto, Bright future for glass-ceramics. Am. Ceram. Soc. Bull. 89 (8) (2010) 19-27.

[15] B. Doerk, E. Weiss, T. Zenker, U. Hoffmann, S. Knoche, M. Taplan, F. Siebers, T. Kraus, L. Klippe &

W. Schmidbauer, U.S. Pat. No. 10,028,580. Washington, D.C.: U.S. Patent and Trademark Office (2018).

[16] E. Brunet, & M. H. Chopinet, U.S. Pat. No. 8,765, 619. Washington, D.C.: U.S. Patent and Trademark Office (2014).

[17] K. Plevacova, E. Brunet, & E. Lecomte, U.S. patent application Ser. No. 14/437,567 (2015).

[18] K. Suzuki, & M. Kinoshita, U.S. Pat. No. 4,184,061. Washington, D.C.: U.S. Patent and Trademark Office (1980).

[19] E. Willhauk, & R. Harikantha, Glass ceramics for household appliances. Low thermal expansion glass-ceramics, 2nd edn. Springer Verlag, Heidelberg (2005) 51-58.

[20] C. T. Li, & D. R. Peacor, The crystal structure of LiAlSi2O6-II ("β spodumene"), Kristallogr.-Cryst. Mater. 126 (1-6) (1968) 46-65.

[21] G. B. Beall, Q. Fu, L. A. Moore, L. R. Pinckney, & C. M. Smith, U.S. Pat. No. 9,701,573. Washington, D.C.: U.S. Patent and Trademark Office (2017).

[22] H. L. Rittler, U.S. Pat. No. 4,461,839. Washington, D.C.: U.S. Patent and Trademark Office (1984).

[23] H. L. Rittler. U.S. Pat. No. 4,507,392. Washington, D.C.: U.S. Patent and Trademark Office (1985).

[24] W. A. Deer, R. A. Howie, & J. Zussman, Rock-forming minerals, 4B: Framework silicates. Silica minerals, feldspathoids and the zeolites, Geological Soc. (2004).

[25] R. Roy, D. M. Roy, & E. F. Osborn, Compositional and stability relationships among the lithium aluminosilicates: eucryptite, spodumene, and petalite. J. Am. Ceram. Soc. 33[5] (1950) 152-159.

[26] N. L. Ross, J. Zhao, C. Slebodnick, E. C. Spencer, & B. C. Chakoumakos, Petalite under pressure: Elastic behavior and phase stability, Am. Mineral. 100 (4) (2015) 714-721.

[27] X. Guo, M. Potuzak, J. C. Mauro, D. C. Allan, T. J. Kiczenski, & Y. Yue, Unified approach for determining the enthalpic fictive temperature of glasses with arbitrary thermal history. J. of Non-Cryst. Solids 357 (16-17) (2011) 3230-3236.

[28] Y. Luo, C. Qu, A. Bhadu, & J. C. Mauro, Synthesis and characterization of $K_2O$—ZnO—$GeO_2$—$SiO_2$ optical glasses. J. of Non-Cryst. Solids 503 (2019) 308-312.

[29] C. Cantalini, & M. Pelino, Characterization of crystal phases, morphology, and crystallization processes in lithium aluminosilicate glass-ceramic. J. Mater. Sci. 27 (2) (1992) 448-452.

[30] S. Shoji, H. Kikuchi, & H. Torigoe, Low-temperature anodic bonding using lithium aluminosilicate-β-quartz glass ceramic. Sens. Actuators, A 64 (1) (1998) 95-100.

[31] A. M. Hu, M. Li, & D. L. Mao, Growth behavior, morphology and properties of lithium aluminosilicate glass ceramics with different amount of CaO, MgO and TiO2 additive. Ceram, Int. 34 (6) (2008) 1393-1397.

[32] B. R. Lawn, & D. B. Marshall, Hardness, toughness, and brittleness: an indentation analysis. J. Am. Ceram. Soc. 62 (7-8) (1979) 347-350.

[33] J. Sehgal, Y. Nakao, H. Takahashi, & S. Ito, Brittleness of glasses by indentation. J. Mater. Sci. Lett. 14 (3) (1995) 167-169.

[34] G. H. Quinn, Fracture toughness of ceramics by the Vickers indentation crack length method: a critical review. In Ceram. Eng. Sci. Proc. Vol. 27. No. 2. American Ceramic Society (2007).

[35] G. R. Anstis, P. Chantikul, B. R. Lawn, D. B. Marshall, A critical evaluation of indentation techniques for measuring fracture toughness: I, direct crack measurements. J. Am. Ceram. Soc. 64 (9) (1981) 533-538.

[36] M. Wada, H. Furukawa, & K. Fujita, Crack resistance of glass on Vickers indentation. In *Proc. Int. Congr. Glass 10th*, vol. 11, pp. 39-46. (1974).

[37] S. Yoshida, A, Hidaka, & J. Matsuoka, Crack initiation behavior of sodium aluminosilicate glasses. J. of non-Cryst. solids 344 (1-2) (2004) 37-43.

[38] A. Pönitzsch, M. Nofz, L. Wondraczek, & J. Deubener, Bulk elastic properties, hardness and fatigue of calcium aluminosilicate glasses in the intermediate-silica range. J. of non-Cryst. Solids 434 (2016) 1-12.

[39] A. Feltz, & A. Morr, Redox reactions in condensed oxide systems: III. Glass formation and properties in the Bi2O3☐ P2O5 system. J. of non-Cryst. solids 74 (2-3) (1985) 313-324.

[40] H. Zhang, Z. He, Y. Zhang, W. Jing, B. Wang, & J. Yang, Lithium Disilicate Glass-Ceramics by Heat Treatment of Lithium Metasilicate Glass-Ceramics Obtained by Hot Pressing. J. Am. Ceram. Soc. 98 (12) (2015) 3659-3662.

[41] J. C, Mauro, Y. Yue, A. J. Ellison, P. K. Gupta, D. C. Allan, Viscosity of glass-forming liquids, Proc. Natl. Acad. Sci. U.S.A. 106 (2009) 19780-19784.

[42] Q. Zheng, J. C. Mauro, Viscosity of glass-forming systems, J. Am. Ceram. Soc. 100 (2017) 6-25.

[43] T. Shibuya, K. Matsui, & M. Matsumoto, U.S. Pat. No. 4,835,121. Washington, D.C.: U.S. Patent and Trademark Office (1989).

[44] A. K. Varshneya, Fundamentals of inorganic glasses. Elsevier (2013) 522.

What is claimed is:

1. A glass-ceramic composition comprising:
a) from about 5 mol % to about 7.5 mol % of $Al_2O_3$;
b) from about 20 mol % to about 25 mol % of $Li_2O$;
c) from about 48 mol % to about 80 mol % of $SiO_2$;
d) from 0 mol % to about 8 mol % of $B_2O_3$,
e) from 0 mol % to about 8 mol % of $ZrO_2$,
f) from 0.01 mol % to about 1 mol % of $P_2O_5$, and
g) from 0 mol % to about 5 mol % of $Na_2O$
having a major crystalline phase comprising from about 20% to about 80% of a β-spodumene phase and from about 20% to about 80% of a petalite phase and a minor crystalline phase comprising up to 10% of a lithium silicate crystalline phase;
wherein the lithium silicate crystalline phase comprises a lithium metasilicate crystalline phase; and wherein the composition exhibits density from about 2.00 g/cm³ to about 2.6 g/cm³.

2. The glass-ceramic composition of claim 1, wherein the glass-ceramic composition exhibits an average transmittance greater than about 80% over a wavelength range from about 390 nm to about 700 nm as measured for a sample prepared from the composition and having a thickness of about 2.00 mm, wherein the glass-ceramic composition comprises a plurality of crystal grains having the median size of a crystal grain is from about 20 to about 80 nm; or wherein the glass-ceramic composition exhibits an average transmittance between 20% and 80% over a wavelength range from about 390 nm to about 700 nm as measured for a sample prepared from the composition and having a thickness of about 2.00 mm, wherein the glass-ceramic composition comprises a plurality of crystal grains having the median size of a crystal grain is from greater than about 80 nm to about 500 nm; or wherein the glass-ceramic composition exhibits an average transmittance lower than 20% over a wavelength range from about 390 nm to about 700 nm as measured for a sample prepared from the composition and having a thickness of about 2.00 mm, wherein the glass-ceramic composition comprises a plurality of crystal grains having the median size of a crystal grain is greater than about 500 nm.

3. The glass-ceramic composition of claim 1, exhibiting Vickers hardness equal to or greater than about 6.0 GPa, and/or exhibiting a crack-resistance greater than about 0.2 kgf, and/or exhibiting a thermal expansion coefficient from about $40 \times 10^{-7}$ to about $90 \times 10^{-7}/°$ C., and/or wherein the composition exhibits a glass transition temperature ($T_g$) from about 450° C. to about 600° C.

4. The glass-ceramic composition of claim 1, wherein the composition further comprises one or more of fining agents selected from $CeO_2$, $SnO_2$, $Fe_2O_3$, $As_2O_3$, $Sb_2O_3$, $MnO_2$, or a combination thereof, and wherein the one or more fining agents are present in a total amount equal to or less than about 1 mol %; and/or further comprising one or more of coloring components selected from transition metal oxides and/or rare earth metal oxide, and wherein the one or more coloring components are present in a total amount equal to or less than about 1 mol %; and/or further comprising a decolorizing agent comprising sodium sulphate, selenium compounds, erbium oxide, cerium oxide, cobalt oxide, manganese oxide, or any combination thereof.

5. A glass-ceramic article comprising:

the glass-ceramic composition of claim 1, wherein the article comprises a hollowware, tableware, container, plate, sheet, float/flat sheet, cookware, powder, fiber, cones, spheres, blades, or any combination thereof.

* * * * *